(12) United States Patent
Dylewski, II et al.

(10) Patent No.: US 12,448,056 B2
(45) Date of Patent: Oct. 21, 2025

(54) BEDSLIDE ASSEMBLY

(71) Applicant: Leer Group, Elkhart, IN (US)

(72) Inventors: Eugene A. Dylewski, II, Granger, IN (US); Tommy C. Brock, Nappanee, IN (US); Christopher P. Zmudzinski, Granger, IN (US)

(73) Assignee: Leer Group, Elkhart, IN (US)

( * ) Notice: Subject to any disclaimer, the term of this patent is extended or adjusted under 35 U.S.C. 154(b) by 348 days.

(21) Appl. No.: 18/164,908

(22) Filed: Feb. 6, 2023

(65) Prior Publication Data

US 2023/0249759 A1 Aug. 10, 2023

Related U.S. Application Data

(60) Provisional application No. 63/307,241, filed on Feb. 7, 2022.

(51) Int. Cl.
*B60P 1/00* (2006.01)
*B60R 9/06* (2006.01)
(Continued)

(52) U.S. Cl.
CPC .......... *B62D 33/0273* (2013.01); *B60P 1/003* (2013.01); *B60R 13/01* (2013.01);
(Continued)

(58) Field of Classification Search
CPC .......... B62D 33/02; B60R 13/01; B60R 5/04; B60R 5/041; B60R 9/06; B60R 2011/0084; B60P 1/003; B60P 1/40
(Continued)

(56) References Cited

U.S. PATENT DOCUMENTS 3,132,755 A     5/1964    Greenslate
3,448,904 A     6/1969    Sahr
(Continued)

FOREIGN PATENT DOCUMENTS

CA       2392444 C     5/2009
CA       2859812 C    10/2016
(Continued)

OTHER PUBLICATIONS

Notification of Decision Concerning Request for Rectification; PCT/US2020/058128; Filing Date Oct. 30, 2020; Dated Jan. 28, 2021.
(Continued)

*Primary Examiner* — Gregory A Blankenship
(74) *Attorney, Agent, or Firm* — Barnes & Thornburg LLP

(57) ABSTRACT

A bedslide assembly is provided. The bedslide assembly includes one or more of a movable deck frame assembly, a latching assembly, a longitudinally extending rod, and a latch. The latching assembly may be attached to the deck frame assembly. The latching assembly may include a plate that is pivotally coupled about an axis to the deck frame assembly. The longitudinally extending rod may be coupled to the plate at a location that is spaced apart from the axis such that movement of the grip moves the longitudinally extending rod which pivots the plate about the axis. The plate includes a latch arm. Movement of the longitudinally extending rod in a first direction pivots the plate which moves the latch arm in order to abut and move the latch.

20 Claims, 24 Drawing Sheets

(51) Int. Cl.
  *B60R 13/01*  (2006.01)
  *B62D 33/02*  (2006.01)
  *B62D 33/027* (2006.01)
  *B62D 33/037* (2006.01)

(52) U.S. Cl.
  CPC ........... *B62D 33/02* (2013.01); *B62D 33/037* (2013.01); *B60R 9/06* (2013.01)

(58) Field of Classification Search
  USPC .................... 296/183.1, 183.2, 37.6, 39.2
  See application file for complete search history.

(56)  References Cited

U.S. PATENT DOCUMENTS

| | | | |
|---|---|---|---|
| 4,410,117 A | | 10/1983 | Crawford et al. |
| 4,485,945 A | | 12/1984 | Ankeny |
| 4,950,123 A | | 8/1990 | Brockhous |
| 5,046,913 A | * | 9/1991 | Domek ............. B60R 5/04 24/514 |
| 5,192,189 A | * | 3/1993 | Murata ............. B60P 1/32 384/42 |
| 5,469,998 A | | 11/1995 | Van Dusen et al. |
| 5,730,338 A | | 3/1998 | Travis |
| 5,934,725 A | * | 8/1999 | Bowers ............. B60P 3/40 414/522 |
| 6,189,748 B1 | | 2/2001 | Hutter et al. |
| 6,318,780 B1 | * | 11/2001 | St. Aubin ............. B60P 1/003 296/37.6 |
| 6,659,524 B1 | | 12/2003 | Carlson |
| 6,796,466 B2 | | 9/2004 | Essig |
| 6,840,558 B1 | * | 1/2005 | Darbishire ............. B60P 1/003 414/522 |
| 6,883,849 B2 | | 4/2005 | Hebert |
| 7,083,219 B1 | * | 8/2006 | Gregory ............. B60P 1/003 414/522 |
| 7,121,603 B2 | * | 10/2006 | Stevenson ............. B60P 1/003 296/37.6 |
| 7,338,104 B1 | * | 3/2008 | Bejin ............. B62D 33/0273 224/403 |
| 7,445,263 B1 | | 11/2008 | Bluhm |
| 7,845,895 B2 | | 12/2010 | Barie et al. |
| 7,861,902 B2 | | 1/2011 | Osenkowski |
| 8,020,911 B2 | * | 9/2011 | McKelvey ............. B60P 1/003 296/37.6 |
| 8,528,800 B1 | | 9/2013 | Newbill |
| 8,540,125 B2 | | 9/2013 | Newbill |
| 9,073,487 B1 | * | 7/2015 | Marshall ............. B60R 5/041 |
| 9,227,547 B2 | | 1/2016 | Williams |
| 9,238,429 B2 | | 1/2016 | Bluhm |
| 9,387,891 B2 | | 7/2016 | Richins |
| 9,610,881 B2 | | 4/2017 | Williams |
| 10,167,025 B2 | | 1/2019 | Richins |
| 10,858,050 B2 | | 12/2020 | Headlee |
| 10,899,399 B1 | | 1/2021 | Yang |
| 11,440,459 B1 | | 9/2022 | Nunn |
| 11,560,183 B2 | | 1/2023 | Agarwal et al. |
| 2002/0180231 A1 | | 12/2002 | Fox |
| 2004/0007889 A1 | | 1/2004 | Hebert |
| 2007/0210599 A1 | | 9/2007 | Arnold |
| 2009/0120976 A1 | | 5/2009 | Mackarvich |
| 2013/0001974 A1 | | 1/2013 | Alexander |
| 2013/0094929 A1 | * | 4/2013 | Bluhm ............. B60P 1/003 414/507 |
| 2013/0221042 A1 | | 8/2013 | Fortner |
| 2013/0341949 A1 | | 12/2013 | Bernthisel |
| 2016/0090016 A1 | | 3/2016 | Williams |
| 2016/0107560 A1 | * | 4/2016 | Thygesen ............. B62D 33/08 296/37.6 |
| 2016/0312482 A1 | | 10/2016 | Robinson et al. |
| 2018/0043810 A1 | * | 2/2018 | Adams ............. B60P 1/003 |
| 2018/0118077 A1 | | 5/2018 | Ferkul et al. |
| 2018/0118283 A1 | | 5/2018 | Gutierrez |
| 2020/0039588 A1 | | 2/2020 | Standifer |
| 2020/0406986 A1 | | 12/2020 | Sosnowich et al. |
| 2021/0129922 A1 | * | 5/2021 | Agarwal ............. B60P 1/003 |
| 2023/0145943 A1 | * | 5/2023 | Allen ............. B60P 1/286 298/12 |
| 2023/0150585 A1 | * | 5/2023 | Agarwal ............. B62D 33/02 296/26.09 |
| 2023/0182651 A1 | * | 6/2023 | Willis ............. B60R 11/06 224/400 |
| 2023/0249759 A1 | * | 8/2023 | Dylewski, II ...... B62D 33/0273 296/26.08 |
| 2023/0406418 A1 | | 12/2023 | Dylewski, II et al. |
| 2024/0132165 A1 | * | 4/2024 | Dylewski, II ........... B60P 1/003 |

FOREIGN PATENT DOCUMENTS

| | | |
|---|---|---|
| CA | 2755082 C | 11/2016 |
| CN | 111924017 A | 11/2020 |
| CN | 212473701 U | 2/2021 |
| GB | 2578736 A | 5/2020 |
| JP | 07257440 A | 10/1995 |
| JP | 08133139 A | 5/1996 |
| JP | 0958534 A | 3/1997 |
| JP | 2568786 Y2 | 4/1998 |
| JP | 2585955 Y2 | 11/1998 |
| JP | 2597103 Y2 | 6/1999 |
| JP | 2600825 Y2 | 10/1999 |
| KR | 20080023040 A | 3/2008 |
| KR | 20080051860 A | 6/2008 |
| KR | 101558481 B1 | 10/2015 |
| WO | 2004082993 A1 | 9/2004 |
| WO | 2004082993 A2 | 9/2004 |
| WO | 2011125172 A1 | 10/2011 |
| WO | 2018081756 A1 | 5/2018 |

OTHER PUBLICATIONS

International Search Report; PCT/US2020/058128; Filing Date Oct. 30, 2020; Dated Jan. 25, 2021.
International Search & Written Opinion; Date of Mailing May 6, 2024; PCT/US2024/12555; Leer Group; "Bedslide No Drill Mounting Bracket".
Extended European Search Report Dated Nov. 14, 2023; Application No. EP 20881050.7-1009 / 4051540 PCT/US2020058128.
International Search & Written Opinion; Date of Mailing Jul. 26, 2022; PCT/US2022/026494; Truck Accessories Group, LLC.

* cited by examiner

BEDSLIDE ASSEMBLY

RELATED APPLICATIONS

The present application relates to and claims priority to U.S. Provisional Patent Application, Ser. No. 63/307,241, filed on Feb. 7, 2022. The subject matter disclosed in that Provisional Application is hereby expressly incorporated into the present application.

TECHNICAL FIELD AND SUMMARY

The present disclosure relates to trucks, such as pickup trucks, and truck beds or cargo boxes used on pickup trucks and like vehicles. In particular, the present disclosure relates to a bedslide assembly affixed to the cargo box, which is extendable from and retractable to the cargo box.

A truck bed or cargo box is a large open space of a pickup truck located behind the cab section. The cargo box is typically composed of a deck floor bounded by opposing sidewalls. A bulkhead wall extends between the opposed sidewalls and is located adjacent the cab section. The tailgate is located opposite the bulkhead wall at the rear end of the cargo box and is movable between open and closed positions.

An illustrative embodiment of the present disclosure provides a bedslide assembly. The bedslide assembly includes a first frame assembly, a second frame assembly, a deck, a grip, a latching assembly, a longitudinally extending rod, a latch, and a spring. The first frame assembly includes a longitudinally extending latch bar having a plurality of latch stop openings periodically located along the longitudinally extending latch bar. The second frame assembly is movable relative to the first frame assembly. The deck is attached to the second frame assembly. The grip is coupled to the second frame assembly. The latching assembly selectively secures the second frame assembly at predetermined locations along its path of travel. The predetermined locations are defined by the plurality of latch stop openings periodically located along the longitudinally extending latch bar. The longitudinally extending rod is coupled to the grip. The latching assembly includes a plate pivotally coupled about an axis to the second frame assembly. The longitudinally extending rod is pivotally coupled to the plate and spaced apart from the axis such that movement of the grip moves the longitudinally extending rod which pivots the plate about the axis. The plate includes a latch arm. The latch is pivotally attached to the second frame assembly. The spring has a bias that moves at least a portion of the latch towards the longitudinally extending latch bar. Upon movement of the longitudinally extending rod in a first direction pivots the plate which moves the latch arm in order to engage and pivot the latch against the bias of the spring and away from the longitudinally extending latch bar.

In the above and other illustrative embodiments, the bedslide assembly may further comprise: the latch being sized to fit into each one of the plurality of latch stop openings so that, when the latch is located in one of the plurality of latch stop openings, the latch prevents movement of the second frame assembly with respect to the first frame assembly; when movement of the grip moves the latch out from one of the plurality of latch stop openings, the second frame assembly is movable with respect to the first frame assembly; when the latch is located adjacent the longitudinally extending latch bar but not in any one of the plurality of latch stop openings the second frame assembly is movable with respect to the first frame assembly until the latch engages a second of the plurality of latch stop openings at which point the second frame assembly is no longer movable with respect to the first frame assembly; movement of the longitudinally extending rod in a second direction moves the latch arm away from the latch causing the bias of the spring to move the latch toward the longitudinally extending latch bar; the latch is configured to fit in one of the plurality of latch stop openings; when the longitudinally extending rod is not moved in the first direction the bias of the spring moves the latch toward the longitudinally extending latch bar; the latch is not attached to the plate; a third frame assembly, at least a portion of which is located between the first frame assembly and the second frame assembly; the second frame assembly includes a hook that couples to the third frame assembly to move the third frame assembly with the second frame assembly when the second frame assembly moves to an extended position from the first frame assembly; the latch arm pushes the latch out from one of the plurality of latch stop openings when the longitudinally extending rod is moved in the first direction and moves away from the latch when the longitudinally extending rod is moved in a second direction; a pivot pin is disposed through the plate coincident with the axis which allows the plate to pivot; the latch arm includes a push pad that is engageable with the latch to move the latch against the bias of the spring.

Another illustrative embodiment of the present disclosure provides a bedslide assembly. The bedslide assembly includes a movable deck frame assembly, a grip, a latching assembly, a longitudinally extending rod, and a latch. The grip is coupled to the deck frame assembly. The latching assembly is attached to the deck frame assembly. The longitudinally extending rod is coupled to the grip. The latching assembly includes a plate that is pivotally coupled about an axis to the deck frame assembly. The longitudinally extending rod is coupled to the plate at a location that is spaced apart from the axis such that movement of the grip moves the longitudinally extending rod which pivots the plate about the axis. The plate includes a latch arm. The latch is not attached to the latching assembly. Movement of the longitudinally extending rod in a first direction pivots the plate which moves the latch arm in order to abut and move the latch.

In the above and other illustrative embodiments, the bedslide assembly may further comprise: a bottom frame assembly, wherein the bottom frame assembly is configured to attach to a cargo box floor, and wherein the bottom frame assembly includes a longitudinally extending latch bar having a plurality of latch stop openings periodically located along the longitudinally extending latch bar; the deck frame assembly being movable relative to the bottom frame assembly; the latching assembly selectively securing the deck frame assembly at predetermined locations along its path of travel, and wherein the predetermined locations are defined by the plurality of latch stop openings periodically located along the longitudinally extending latch bar; the latch is pivotally attached to the deck frame assembly; and the bias of a spring moves at least a portion of the latch away from the latch arm; and the latch arm abuts and moves the latch.

Additional features and advantages of the bedslide assembly will become apparent to those skilled in the art upon consideration of the following detailed descriptions of carrying out the bedslide assembly as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of bedslide assembly, and such exemplification is not to be construed as limiting the scope of the bedslide assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a bedslide assembly that is attached to the cargo box floor and is extendable and retractable relative thereto. For example, the bedslide may be slid over the cargo box floor and contained within the truck bed. Conversely, the bedslide may be pulled from the cargo box not unlike a drawer pulled from a cabinet.

As part of the illustrative disclosure herein, a movable bedslide assembly is provided that includes a latching assembly to selectively secure the bedslide deck at predetermined locations along its path of travel.

Figure 1:
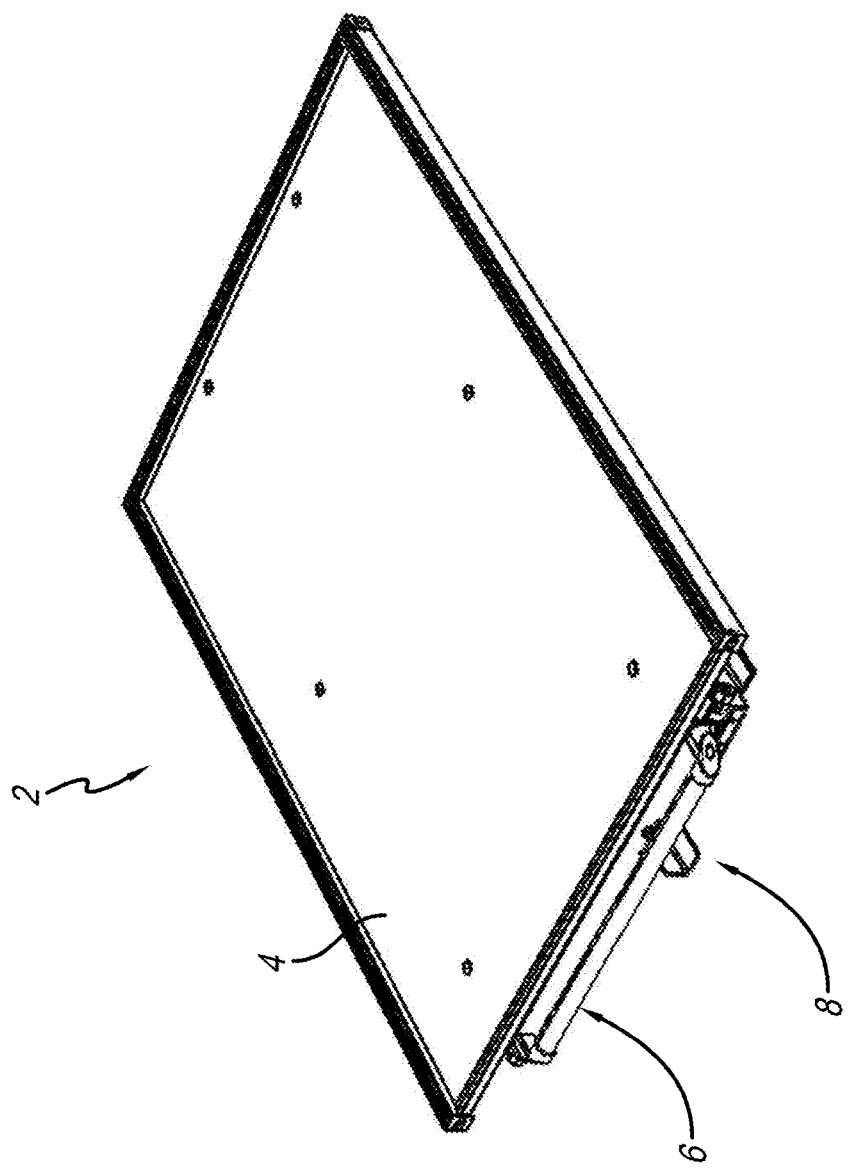
FIG. 1 is a perspective view of a bedslide assembly located in a retracted position.

A perspective view of a bedslide assembly 2, with the bedslide deck 4 located in its retracted position, is shown in FIG. 1. Here, bedslide deck 4 is located over the frame members, positioned over the deck floor (not shown) of a truck bed, as well. A handle 6 is attached to top frame assembly 8. By holding handle 6, bedslide assembly 2 may be pulled into an extended position or pushed back to a retracted position in the truck bed or cargo box.

Figure 2:
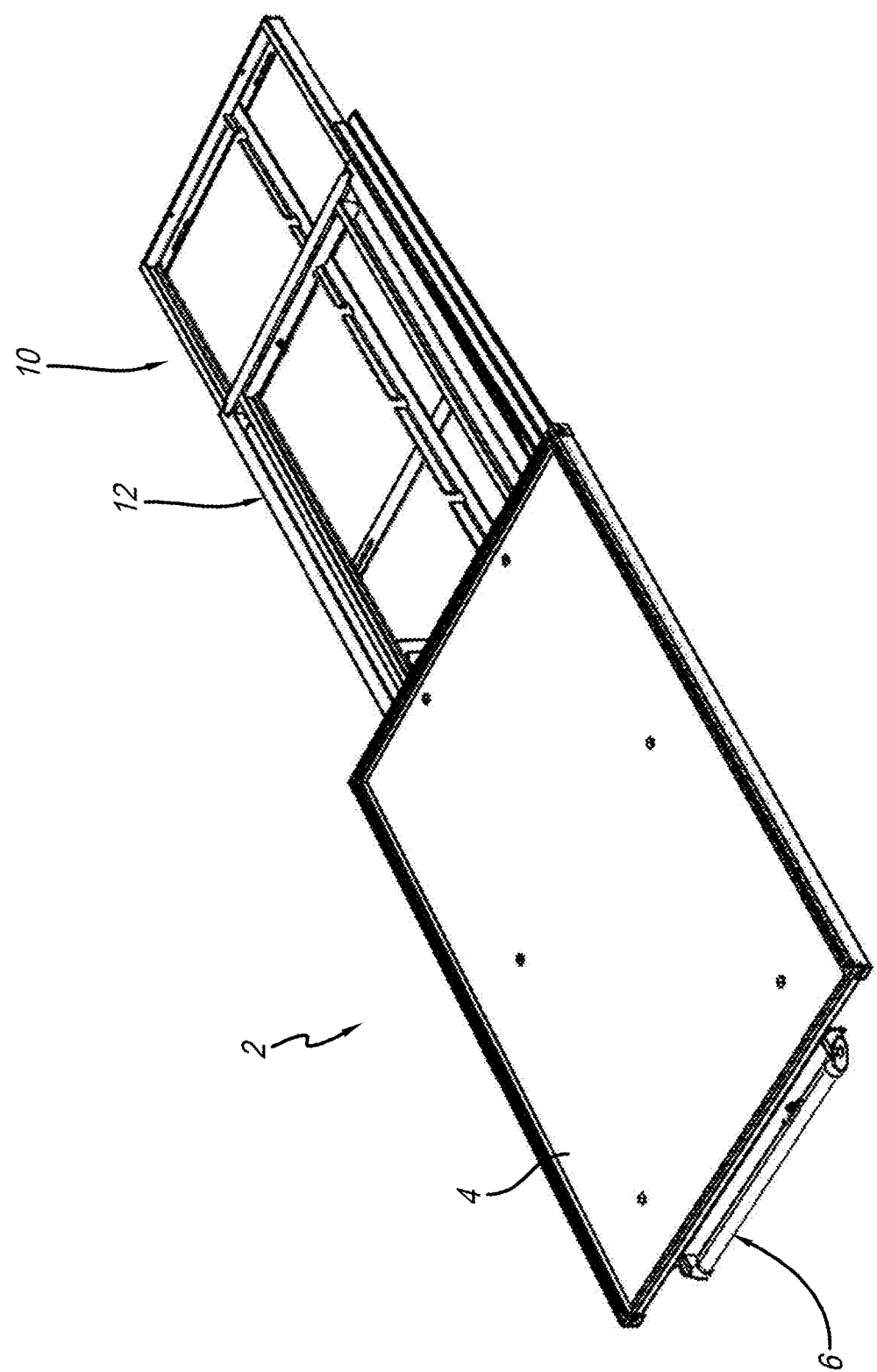
FIG. 2 is the bedslide assembly of FIG. 1, with the bedslide assembly located in an extended position.

A perspective view of bedslide deck 4, extended from a bottom frame assembly 10, which will be attached to a truck bed deck floor (not shown), is shown in FIG. 2. This allows the bedslide deck to extend from the deck floor of the truck bed or cargo box. Also shown in this view is middle frame assembly 12, which provides further extension of bedslide deck 4 from the truck bed. In this way, contents to be stored in the truck bed can be placed on bedslide deck 4 that may be either extended from the truck bed or retracted into the truck bed for easier access.

Figure 3:
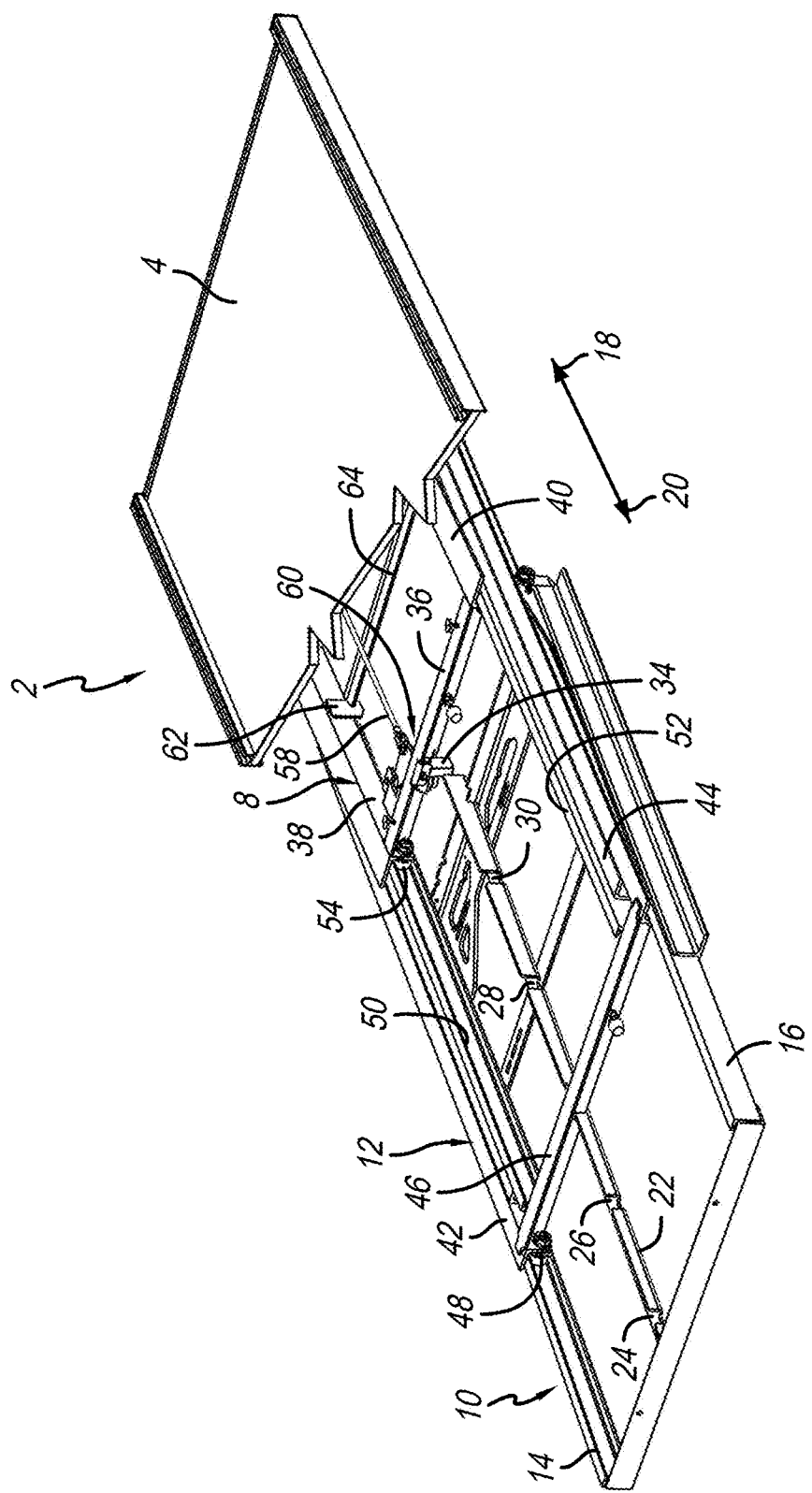
FIG. 3 is a rear perspective view of the bedslide assembly shown in an extended position.

A rear perspective view of bedslide assembly 2, shown in an extended position, is shown in FIG. 3. This view depicts the bottom frame assembly including side tracks 14 and 16 extending along the lines of travel of top frame assembly 8 and deck 4, in directions 18 and 20. A latch bar is attached to the bottom frame assembly 10 and is longitudinally extending along the length of travel of top frame assembly 8 and deck 4 as well.

Latch stop openings 24, 26, 28, 30, and 31 (see, also, FIG. 9) are disposed in latch bar 22 in order to provide stop locations for top frame assembly 8 along its length of travel. A latch 34 is pivotally attached to back plate 36 which is a crossbar extending between sidebars 38 and 40 of top frame assembly 8. Latch 34 is sized and configured to selectively fit into each of latch stop openings 24, 26, 28, 30, and 31 depending on the positioning of top frame assembly 8. Latch 34 is also spring biased towards each of latch stop openings 24, 26, 28, 30, and 31 so that, as top frame assembly 8 travels in either directions 20 or 18, latch 34 will ride along latch bar 22 until it encounters one of the latch stop assemblies. At this point, latch 34 will engage the latch stop opening causing top frame assembly 8 to stop travel at that location. It is appreciated that the positioning of latch stop openings 24, 26, 28, 30, and 31 can be at any desired position along latch bar 22. In addition, the number of latch bar openings can be increased or decreased from that shown in this illustrated embodiment.

Middle frame assembly 12 is shown including sidebars 42 and 44, with a back plate 46 extending therebetween. Rollers, such as roller 48, are each attached to sidebar 42 and 44, respectively, and fitted into side tracks 14 and 16, respectively, of bottom frame assembly 10. This allows middle frame assembly 12 to travel alongside side tracks 14 and 16 in directions 18 and 20. Side track 50 is located adjacent sidebar 42 and side track 52 is located adjacent sidebar 44. As illustratively shown, rollers 54 (see, also, FIG. 20) are each attached to sidebar 38 and 40, respectively, and fitted into side tracks 50 and 52, respectively, of middle frame assembly 12. This allows top frame assembly 8 to move along side tracks 50 and 52 of middle frame assembly 12 while traveling in directions 18 and 20.

A longitudinally extending rod 58 extends from a latching assembly 60, coupled to top frame assembly 8, in order to selectively move latch 34. When longitudinally extending rod 58 moves latching assembly 60 it engages latch 34 (see, also, FIGS. 24, 25, and 26) to move it out from one of the latch stop openings 24, 26, 28, 30, or 31 to allow top frame assembly 8 to move in either directions 18 or 20. It is contemplated that longitudinally extending rod 58 may, alternatively, be a flexible cable.

A hook 62, attached to top frame assembly 8, and, illustratively, sidebar 38 is engageable with crossbar 64 of middle frame assembly 12. This allows middle frame assembly 12 to travel with top frame assembly 8 when moving in direction 18. When this happens, middle frame assembly 12 moves along bottom frame assembly 10.

Figure 4:
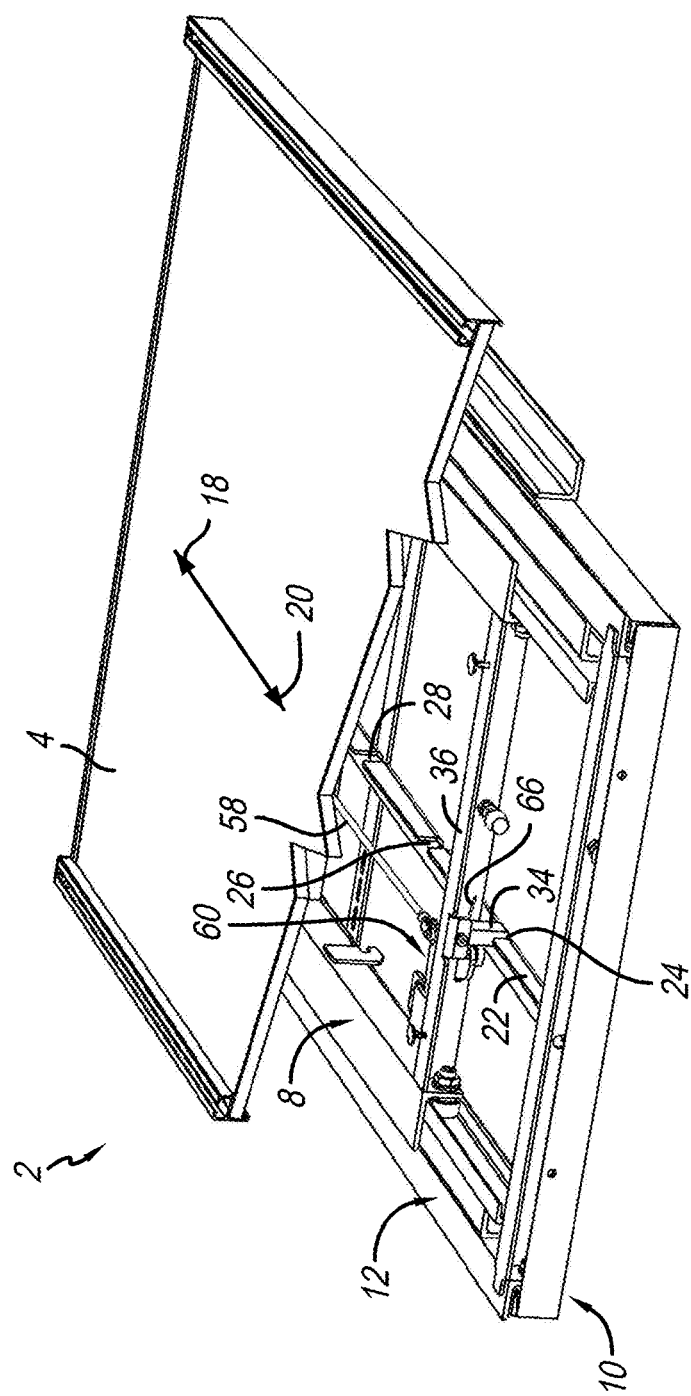
FIG. 4 is a rear perspective view of the bedslide assembly located in a retracted position, with a portion of the bedslide deck removed for demonstrative purposes, to show portions of the frame assemblies underneath.

A rear perspective view of bedslide assembly 2, located in a retracted position, with a portion of bedslide deck 4 removed for demonstrative purposes, to view portions of the frame assemblies underneath, is shown in FIG. 4. Here, both top frame assembly 8 and middle frame assembly 12 are shown retracted in bottom frame assembly 10. In this position, latch 34, attached to back plate 36, is positioned in latch stop opening 24. This holds top frame assembly 8 at this position with respect to bottom frame assembly 10. Latch assembly 60 is disengaged from latch 34 when in a latch stop opening, such as latch stop opening 24, as shown. When longitudinally extending rod 58 is moved into direction 18, it activates latching assembly 60, which acts on latch 34 to remove it from latch stop opening 24.

Figure 5:
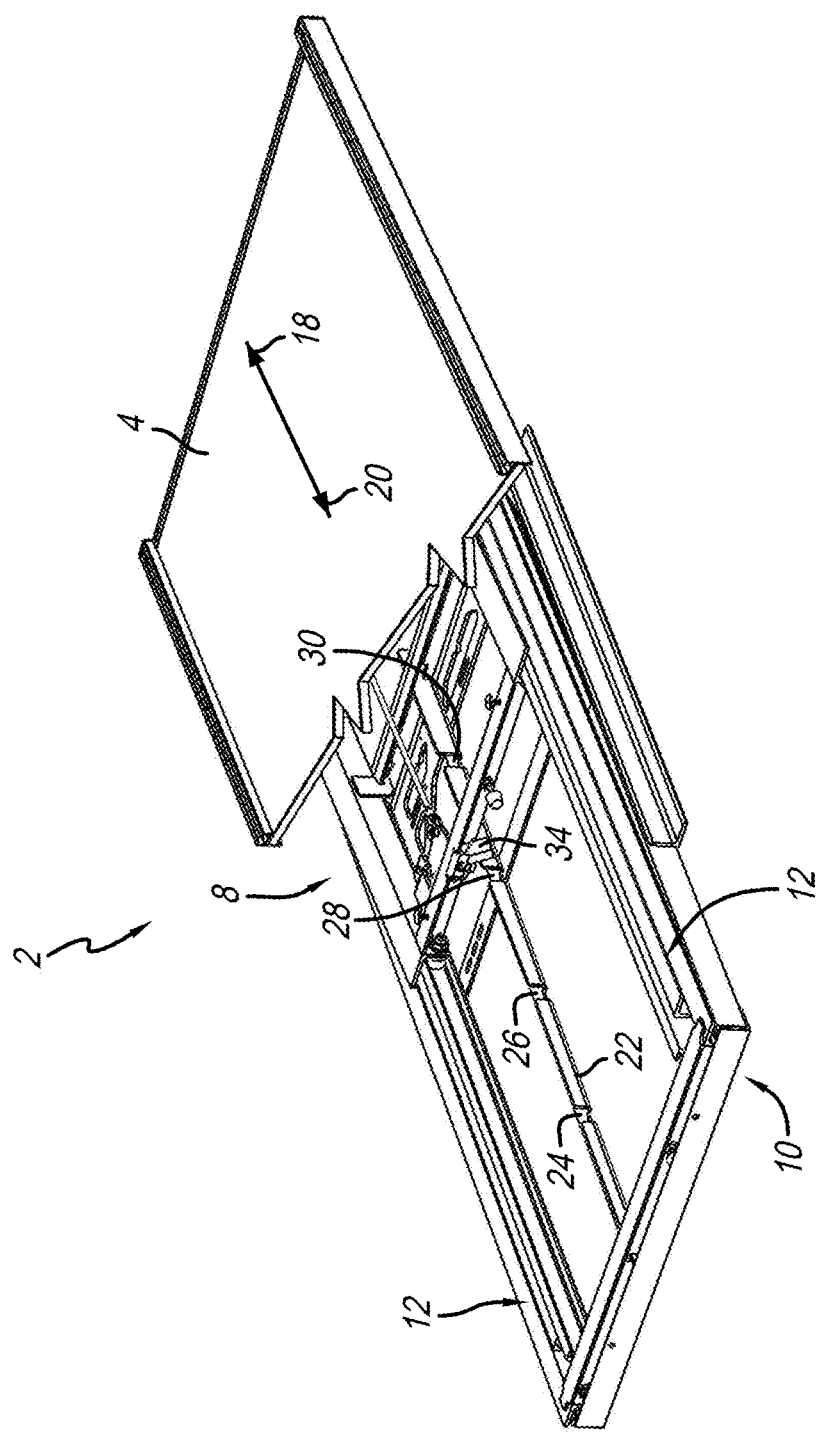
FIG. 5 is a rear perspective view of the bedslide assembly with a portion of the deck removed for demonstrative purposes.

A rear perspective view of bedslide assembly 2, in a partially extended position, with a portion of deck 4 removed for demonstrative purposes, is shown in FIG. 5. In this view, latch 34 is removed from any of the latch stop openings. Because latch 34 is biased via spring 66 (see, also, FIGS. 24, 25, and 26) toward the latch stop openings, it will ride along latch bar 22 as top frame assembly 8 moves in direction 18 or 20. This occurs until latch 34 encounters one of latch stop openings 24, 26, 28, 30, or 31, at which point the bias from spring 66 will move latch 34 into one of the latch stop openings. This stops top frame assembly 8 at that particular location on bottom frame assembly 10. Thus, top frame assembly 8, as well as deck 4, may move in either directions 18 or 20 so long as latch 34 is not positioned in one of the latch stop openings 24, 26, 28, 30, or 31. As top frame assembly 8 travels in directions 18 and 20, when latch 34 encounters one of the latch stop openings 24, 26, 28, 30, or 31, the bias of spring 66 moves latch 34 into one of those latch stop openings which prevents top frame assembly 8 from moving in either direction 18 or 20.

Figure 6:
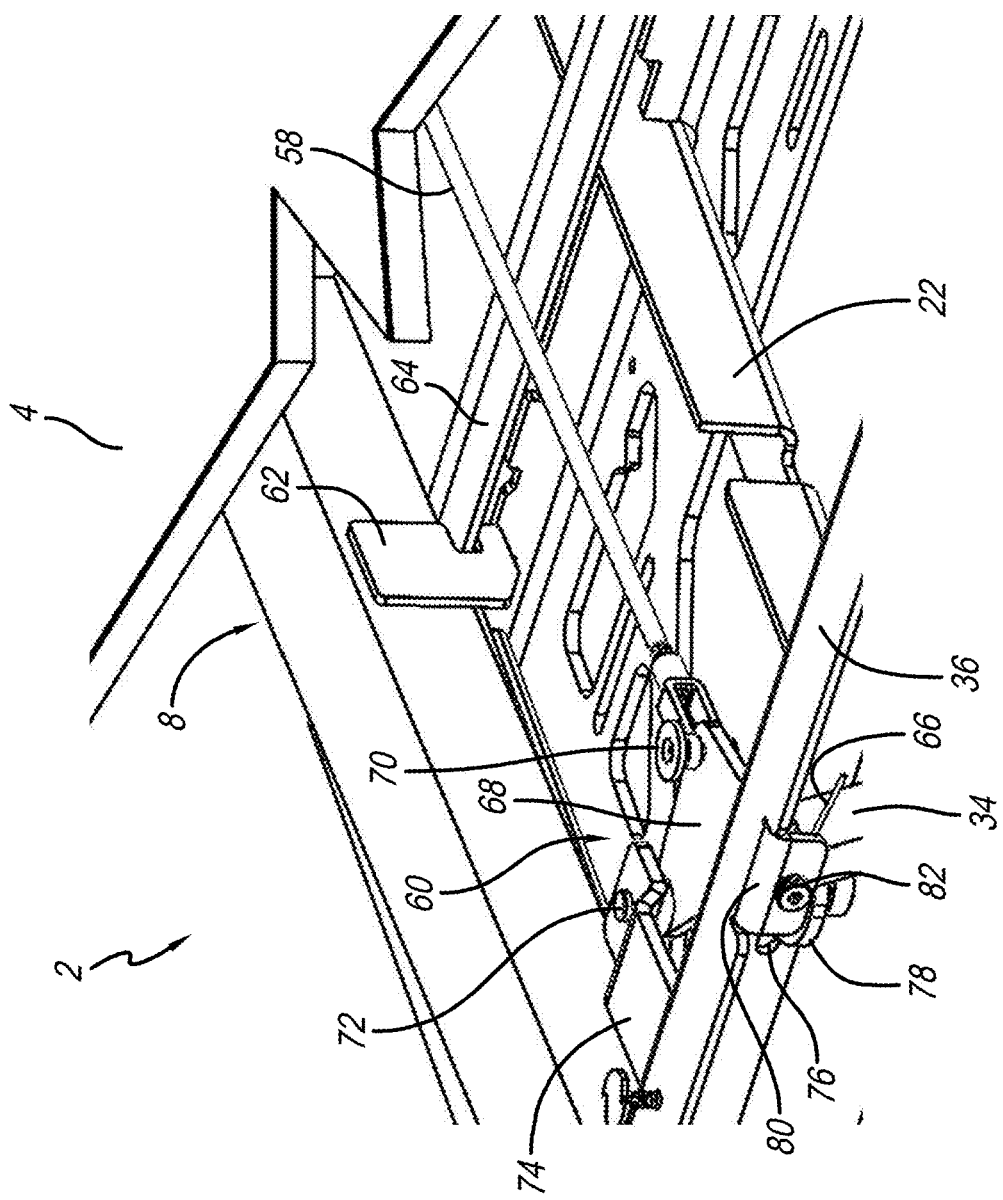
FIG. 6 is a rear detail perspective view of a portion of the bedslide with the portion of the bedslide deck removed for demonstrative purposes.

A rear detail perspective view of a portion of bedslide assembly 2, with a portion of bedslide deck 4 removed for demonstrative purposes, is shown in FIG. 6. Longitudinally extending rod 58 is pivotally connected to plate 68 of latching assembly 60 via pivot pin 70. Spaced apart from pivot pin 70 is pin 72 that pivotally couples bracket 68 to bracket 74 illustratively located on back plate 36 of top frame assembly 8. A slot 76 is disposed through back plate 36 to receive latch arm 78, which may be attached to or integrally part of plate 68. It is this latch arm 78 that engages latch 34 against the bias of spring 66 to move out of one of the latch stop openings. In the illustrative embodiment, a bracket 80 is attached to back plate 36 and receives a pin 82, which is disposed through a portion of latch 34 to provide the pivoting function of same. Also shown in this view is hook 62 that is engageable with crossbar 64 of middle frame assembly 12 so that, as top frame assembly 8 moves in direction 18 (see, also, FIG. 5), hook 62 engages crossbar 64 so middle frame assembly 12 will move along with top frame assembly 8.

Figure 7:
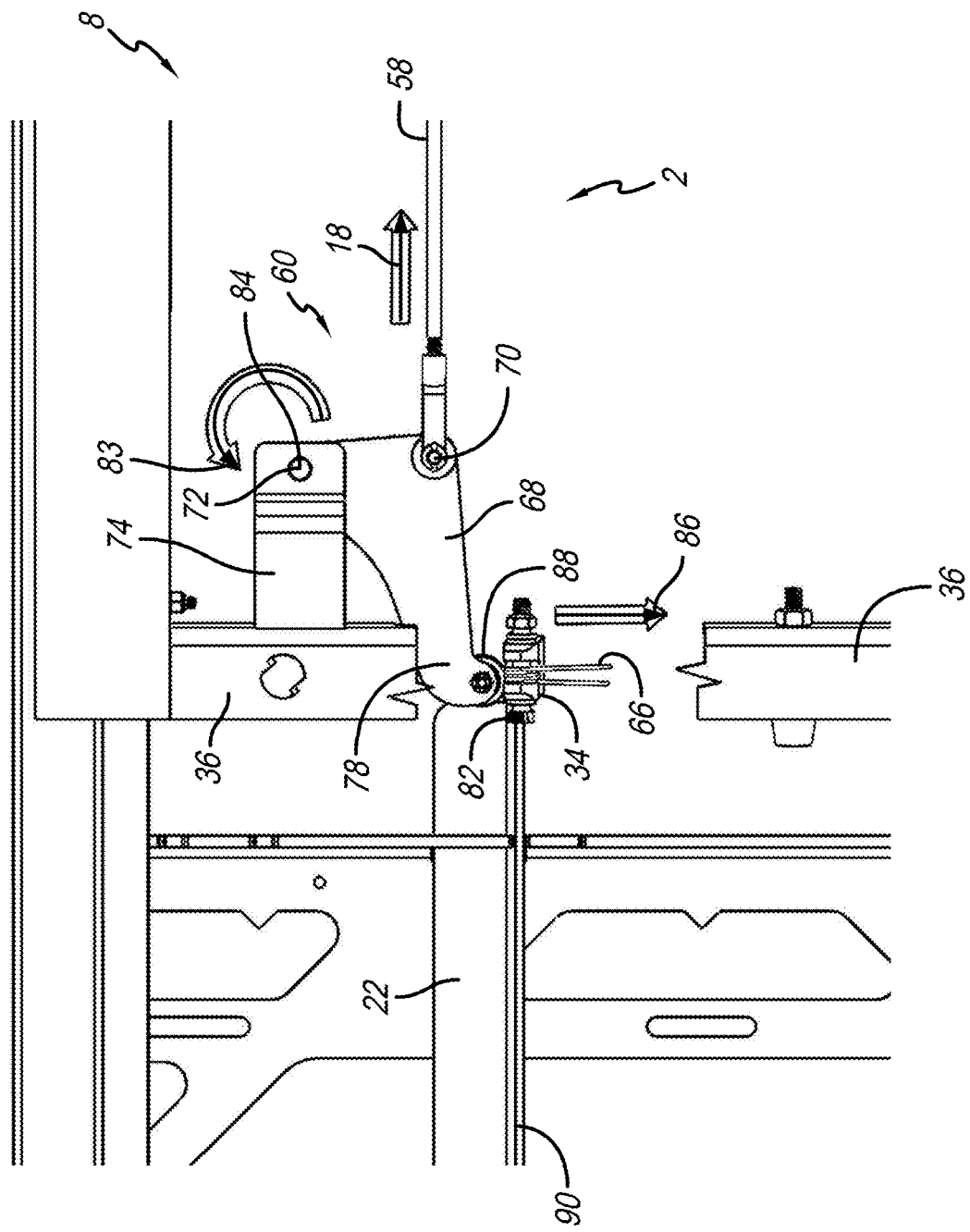
FIG. 7 is a top detail view of a portion of the bedslide assembly.

A top detail view of a portion of bedslide assembly 2 is shown in FIG. 7. Here, latching assembly 60 is shown attached to top frame assembly 8. Specifically, plate 68 receives pivot pin 70 also coupled to longitudinally extending rod 58. When pivotally extending rod 58 is removed, in this case, illustratively in direction 18, it pulls on plate 68. Pivot pin 72 is disposed through both plate 68 and bracket 74 shown attached to back plate 36 of top frame assembly 8. This movement in direction 18 by longitudinally extending rod 58 pivots plate 68 in arcuate direction 83 about an axis 84 coincident with the longitudinal extent of pin 72. The effect of this is that rod 58 pulls on plate 68 so it arcuately pivots in direction 83. This moves the latch arm 78 portion of plate 68 in direction 86 towards latch 34 currently positioned within one of the latch stop openings of latch bar 22. Bracket 80, as well as a portion of back plate 36, have been removed in order to show latch arm 78 and it's interaction with latch 34. This view also shows pin 82, as well as spring 66. It is appreciated that spring 66 biases latch 34 in an opposite direction 86 towards latch arm 78 so that latch 34 fits in one of the latch stop openings 24, 26, 28, 30, or 31 to hold top frame assembly at that location along latch bar 22.

Figure 8:
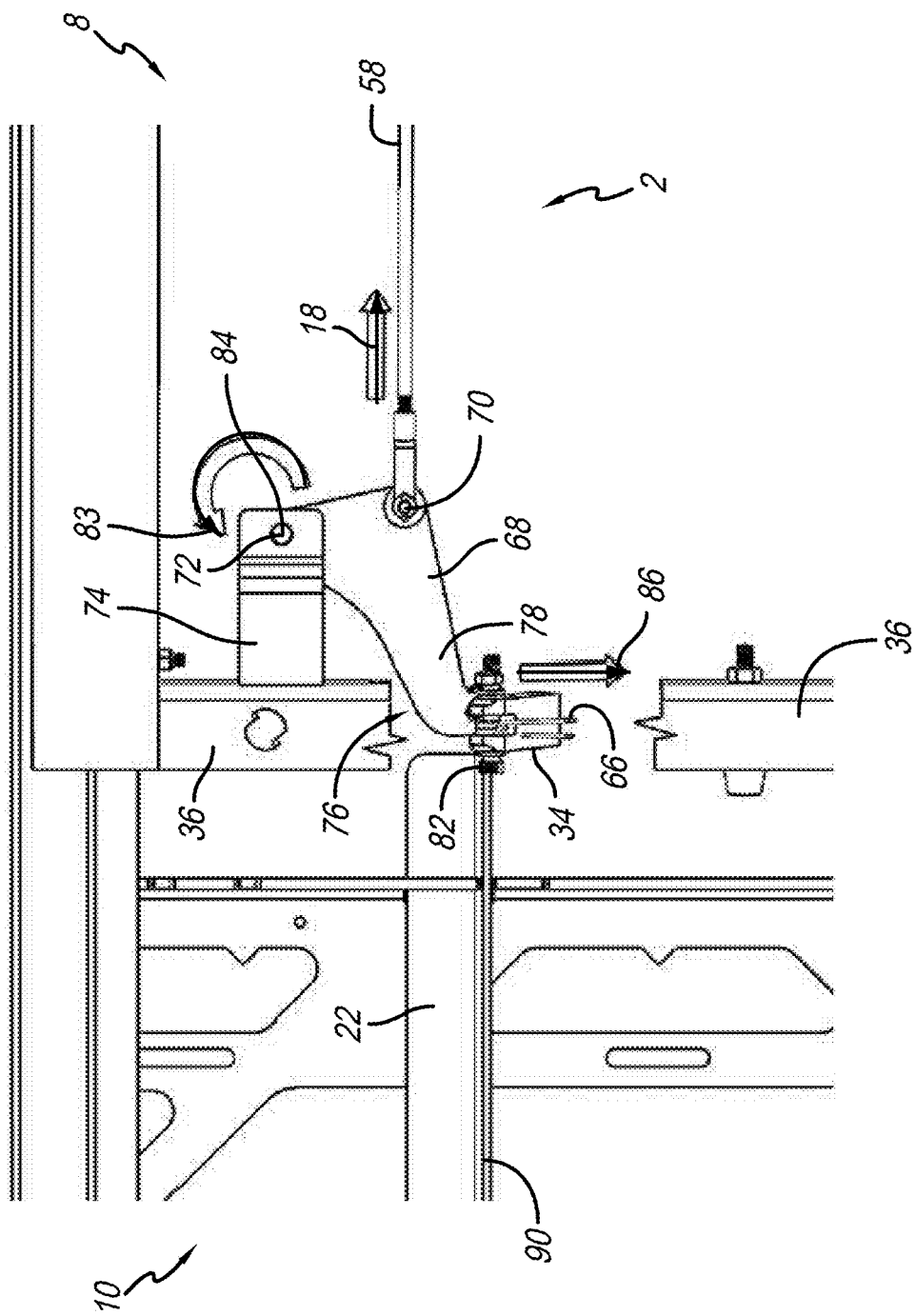
FIG. 8 is another top detail view of the portion of the bedslide assembly.

Another top detail view of a portion of bedslide assembly 2 is shown in FIG. 8. This view is similar to that of FIG. 7 with the exception of longitudinally extending rod 58 pulled in direction 18 further pivoting plate 68 in direction 83 about axis 84 created by pin 72. As further shown, this movement of plate 68 moves latch arm 78 in direction 86 causing it to act on latch 34 to pivot same about pin 82 with a portion of latch 34 also moving in direction 86 against the bias of spring 66. As can be appreciated by this view, this movement of latch arm 78 has the effect of pushing a portion of latch 34 out of one of the latch stop openings 24, 26, 28, 30, or 31 of latch bar 22. This allows top frame assembly 8 to freely move in either directions 18 or 20 as desired. A push pad 88 is illustratively attached to the end of latch arm 78 to provide a contact surface for engaging latch 34.

It is also appreciated from this view, and FIG. 7, that latch arm 78 extends through slot 76 disposed through back plate 36 of top frame assembly 8. It is further appreciated that when latch 34 is removed from a latch stop opening, it may ride along top edge 90 of latch bar 22 until it encounters another latch stop assembly. At which point latch 34, because of the spring bias of spring 66, will move back into the latch stop opening to stop movement of top frame assembly 8.

Figure 9:
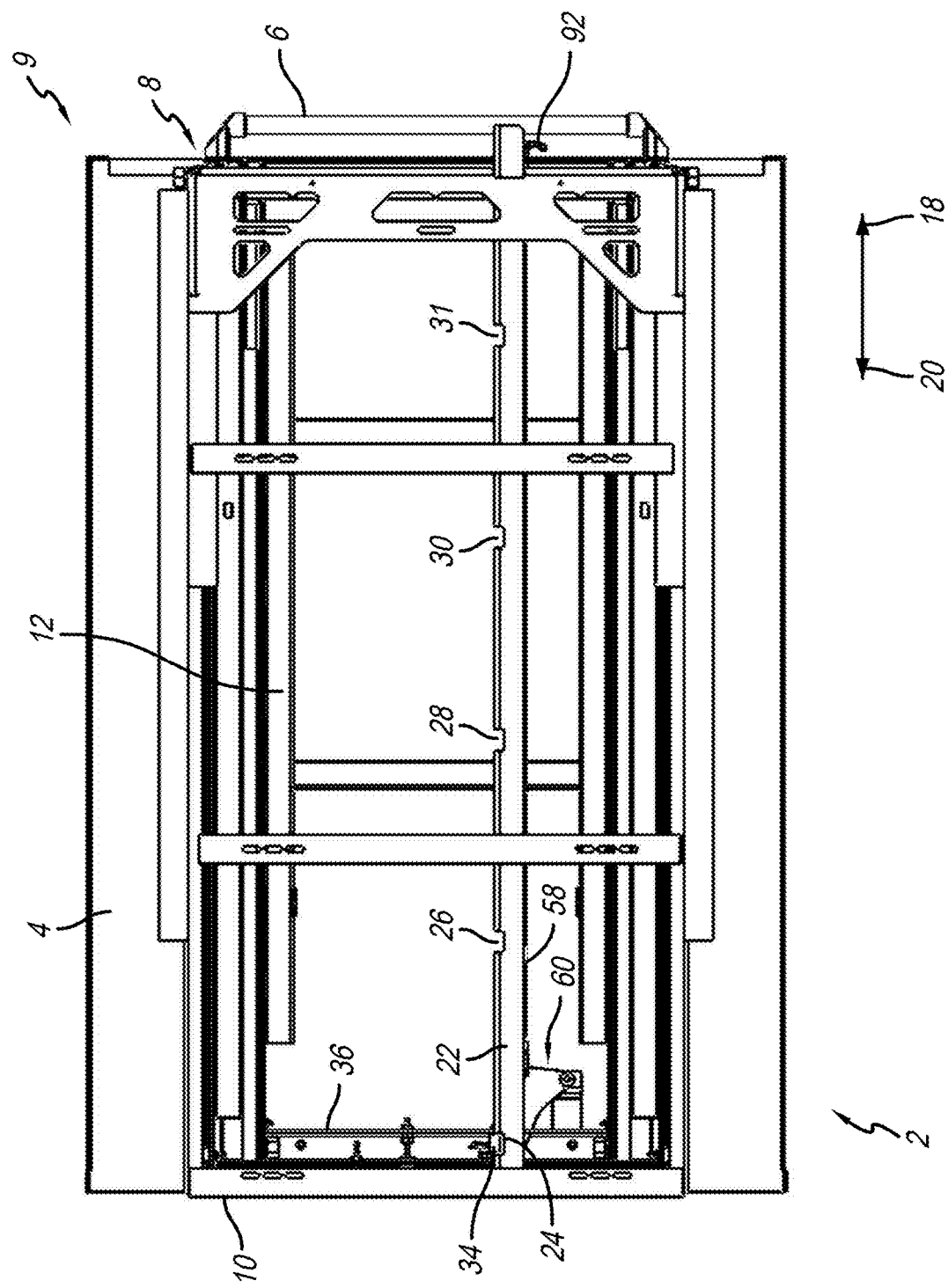
FIG. 9 is an underside view of the bedslide assembly in a retracted position.

An underside view of bedslide assembly 2, shown in a retracted position, is shown in FIG. 9. The underside views of FIGS. 9, 10, 11, 12, 13, and 14 are progression views demonstrating how top frame assembly 8 moves from bottom frame assembly 10. The view in FIG. 9 depicts latch 34 located within latch stop opening 24 holding top frame assembly 8 with its attached deck 4 in this retracted position. Here, these components cannot move until a grip 92 pulls longitudinally extending rod 58 illustratively in direction 18 to actuate latching assembly 60 to move latch 34 out of latch stop opening 24, as discussed ith respect to FIGS. 7 and 8, for example. It is appreciated that the direction of movement of rod 58 by grip 92 is illustrative. They can be moved in other directions as needed so long as they move latching assembly 60.

Figure 10:
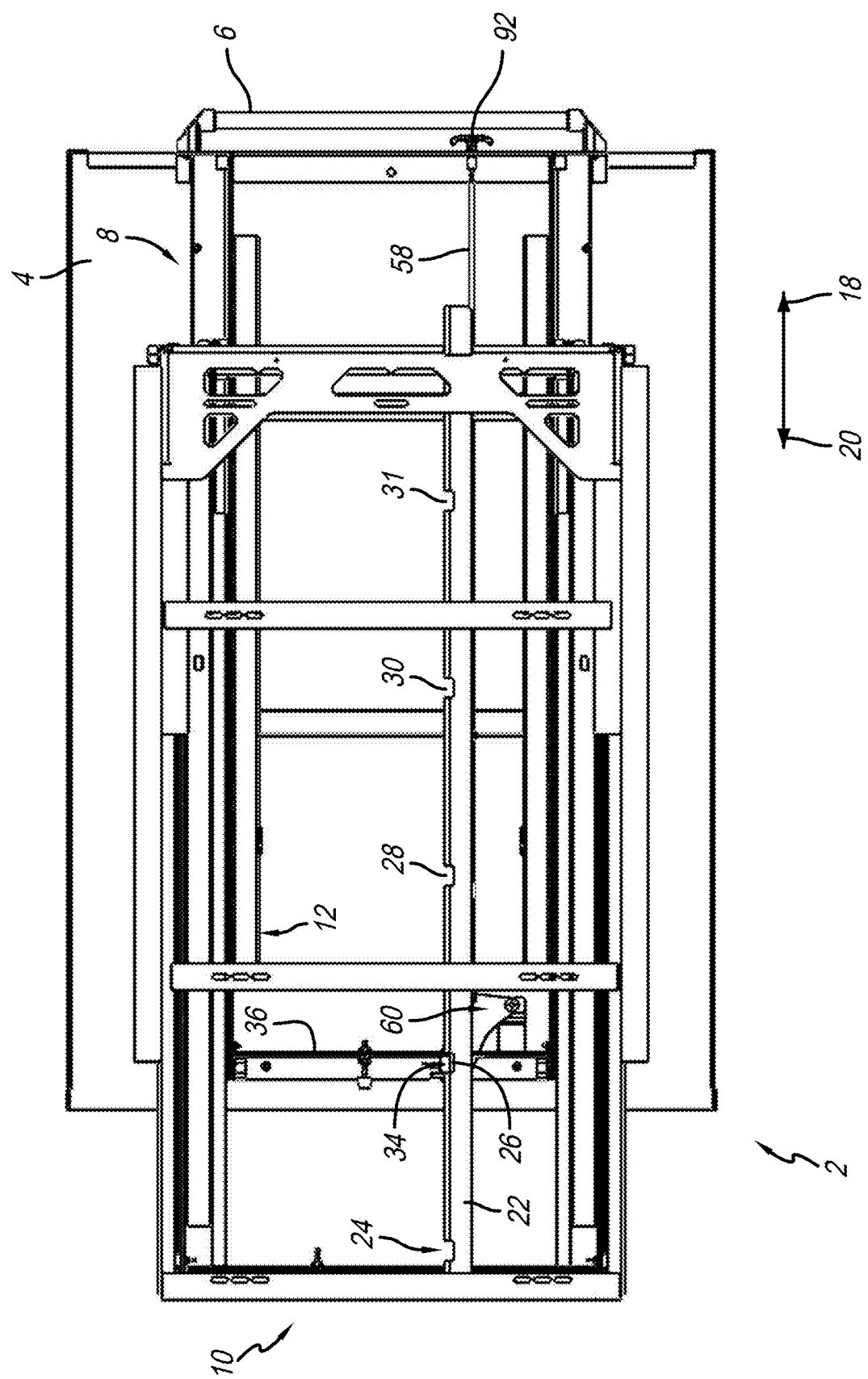
FIG. 10 is another underside view of the bedslide assembly with the top frame assembly and deck moved to an extended position with respect to the bottom frame assembly.
Figure 11:
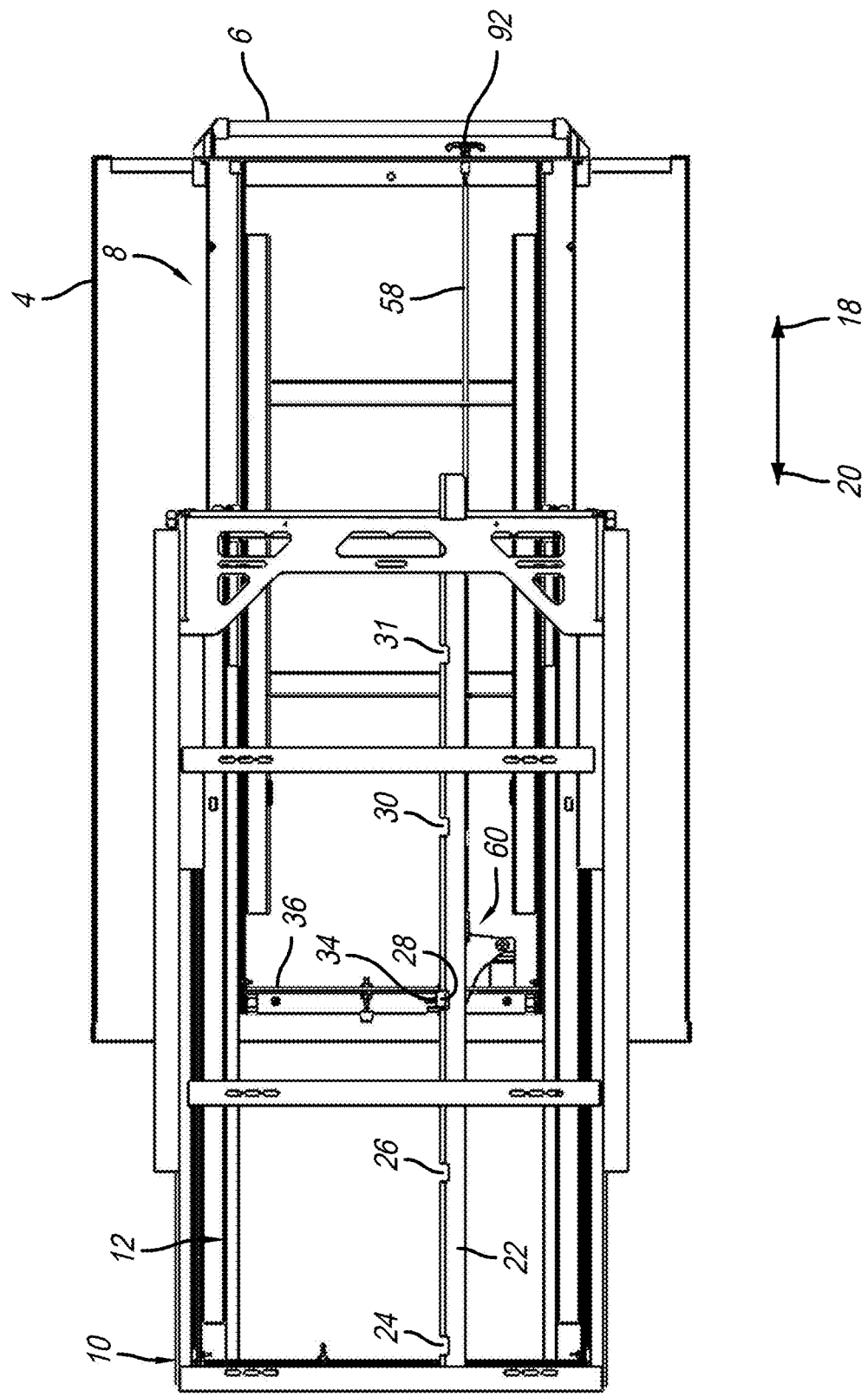
FIG. 11 is another underside view of the bedslide assembly with the top frame assembly and deck located in an extended position with respect to the bottom frame assembly.

Upon latch 34 being removed from latch stop opening 24, top frame assembly 8, with deck 4, is able to move in direction 18 until latch 34 encounters latch stop opening 26. At this point, top frame assembly 8 is caused to stop again, as shown in FIG. 10. This process continues in FIG. 11 with top frame assembly 8 and deck 4 moving further in direction 18 until latch 34 encounters latch stop opening 28. Contrasting this view in FIG. 11 from those of FIGS. 9 and 10, it is appreciated that top frame assembly 8, with deck 4, is moved further in direction 18, thereby extending it further from bottom frame assembly 10. This has the practical effect of extending deck 4 further out from the cargo box of the pickup truck.

Figure 12:
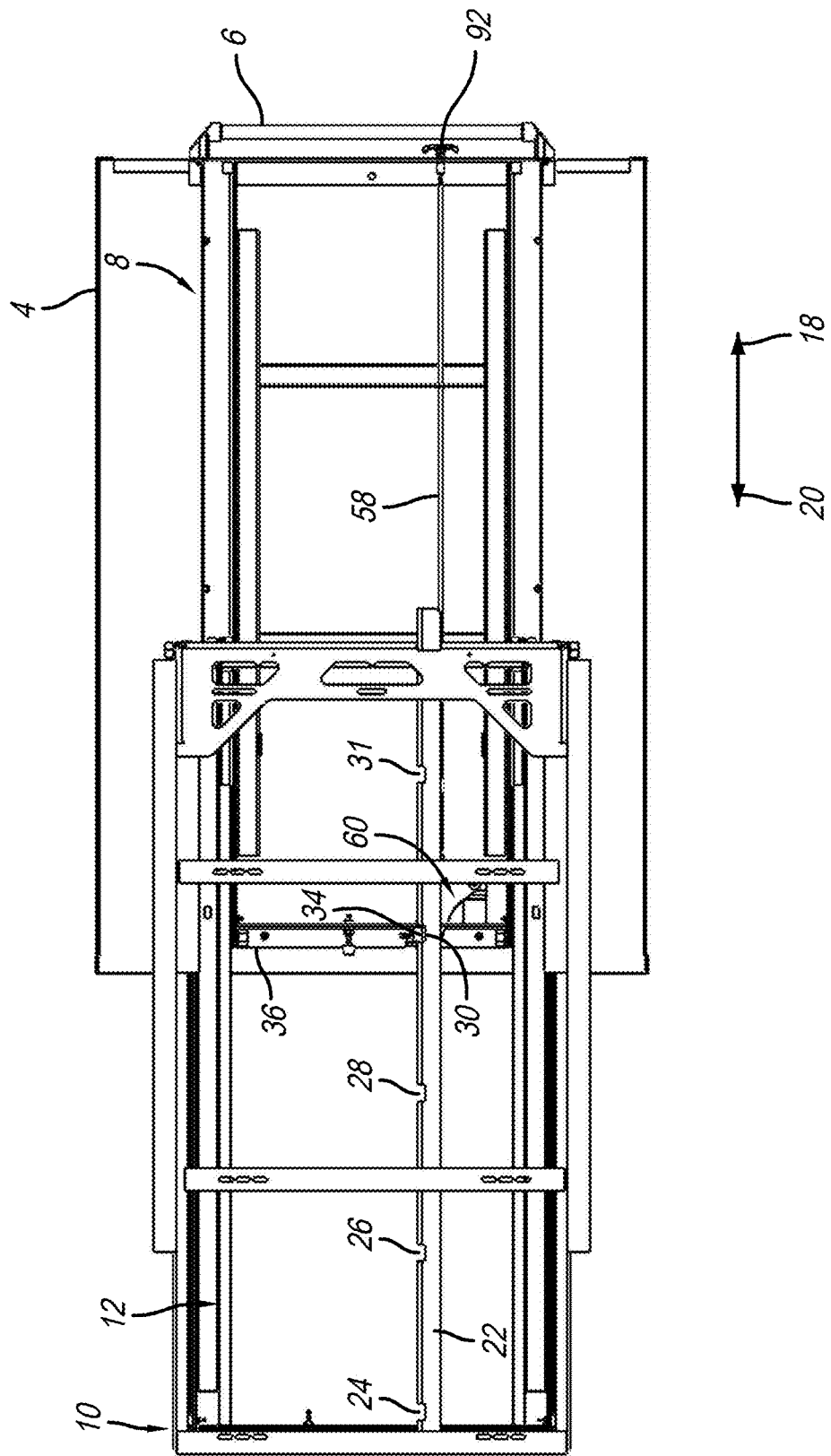
FIG. 12 is another underside view of the bedslide assembly with the top frame assembly and deck extended.
Figure 13:
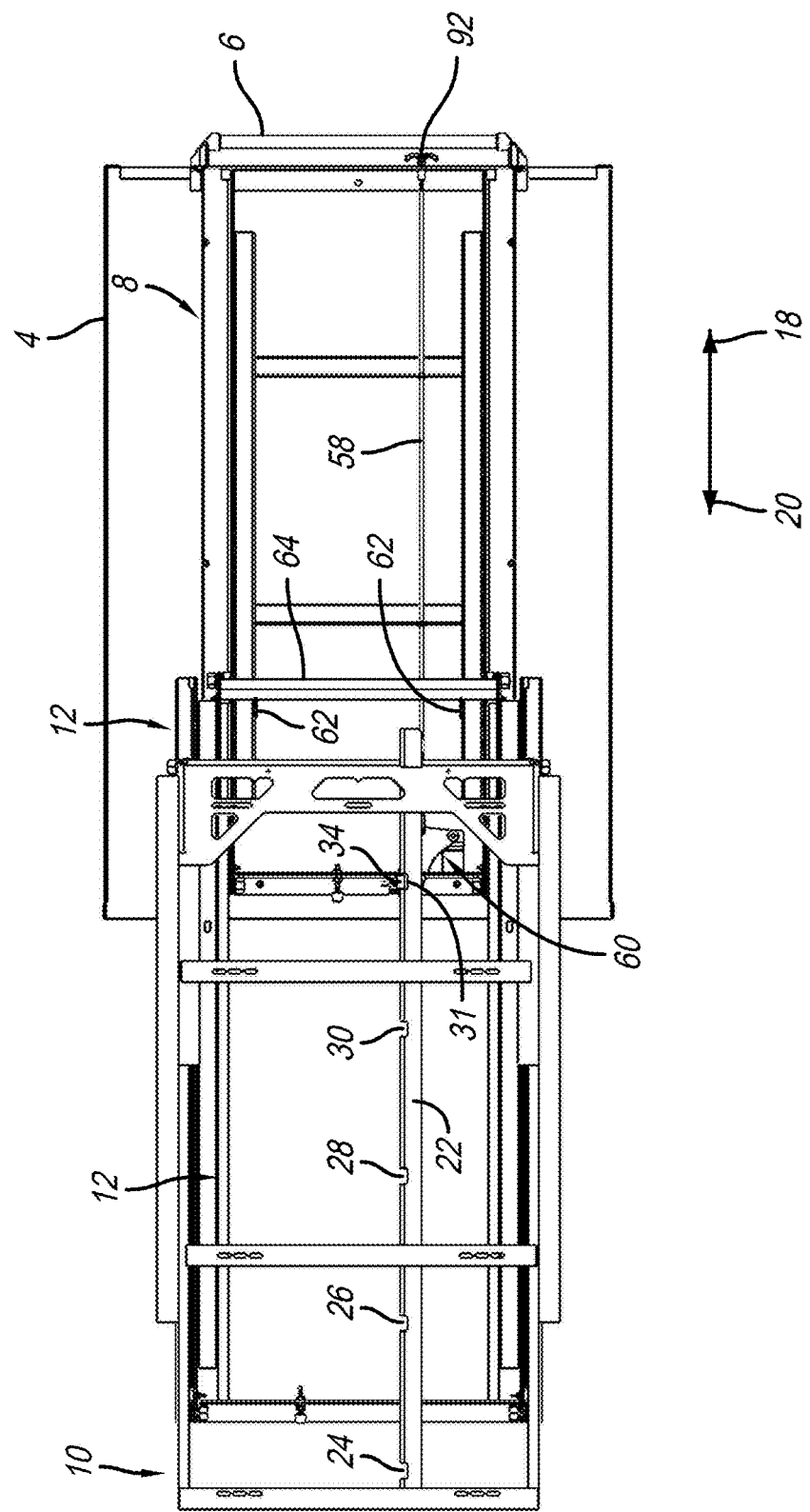
FIG. 13 is another underside view of the bedslide assembly with the top frame assembly and deck in an extended position with respect to the bottom frame assembly and the mid frame assembly in an extended position with respect to the bottom frame assembly.

Like the other figures in this series of progression views, top frame assembly 8, with deck 4 moving further in direction 18, further extends same from bottom frame assembly 10, as shown in FIG. 12. Here, latch 34 is disposed in latch stop opening 30. The view in FIG. 13 shows top frame assembly 8, with deck 4 moved further in direction 18, to extend same even further from bottom frame assembly 10. Additionally, in this view, hook 62, located on top frame assembly 8 engages crossbar 64 of middle frame assembly 12, pulls same in direction 18 as well. Also shown is latch 34 is positioned in latch stop opening 31.

Figure 14:
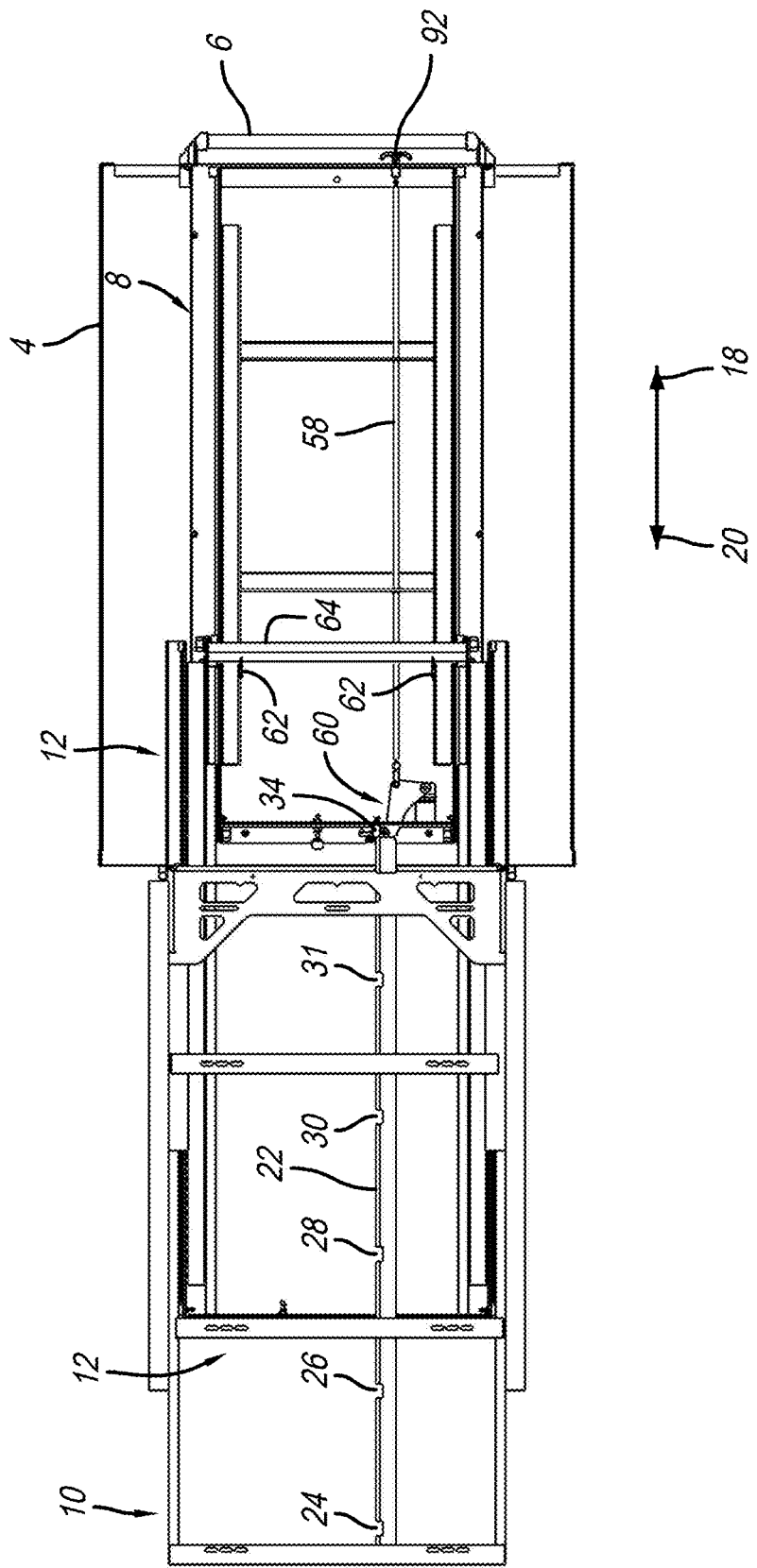
FIG. 14 is another underside view of the bedslide assembly with the top frame assembly and deck in an extended position with respect to the bottom frame assembly and the middle frame assembly in an extended position with respect to the bottom frame assembly.

The view in FIG. 14 shows top frame assembly 8, with deck 4 attached thereto, moved even further in direction 18 from that shown in FIGS. 13, 12, 11, 10, and 9. At this point, latching assembly 60 and latch 34 are pulled further than the extent of latch bar 22 on bottom frame assembly 10. Also shown in this view is hook 62 pulling crossbar 64 of middle frame assembly 12 even further in direction 18 to assist in providing structural support under top frame assembly 8 at this further extended position from bottom frame assembly 10.

Figure 15:
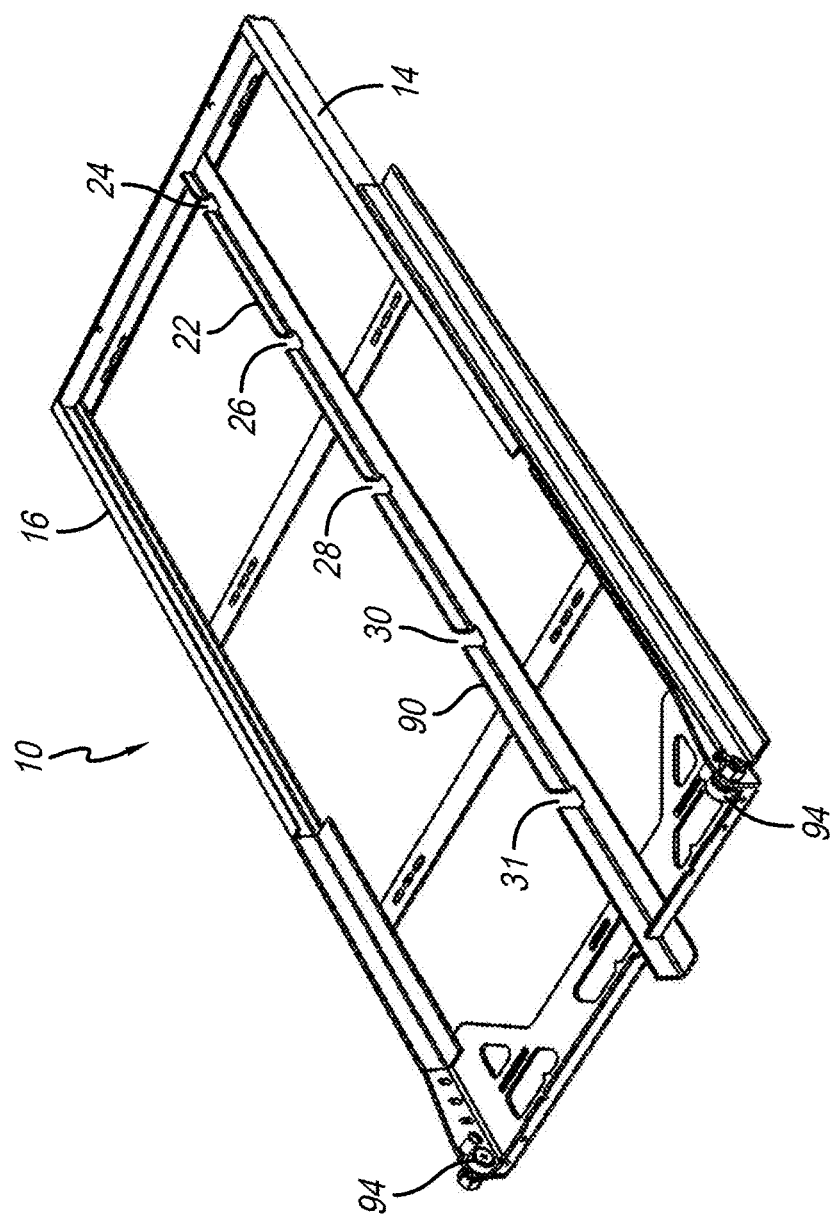
FIG. 15 is a perspective view of the bottom frame assembly.
Figure 16:
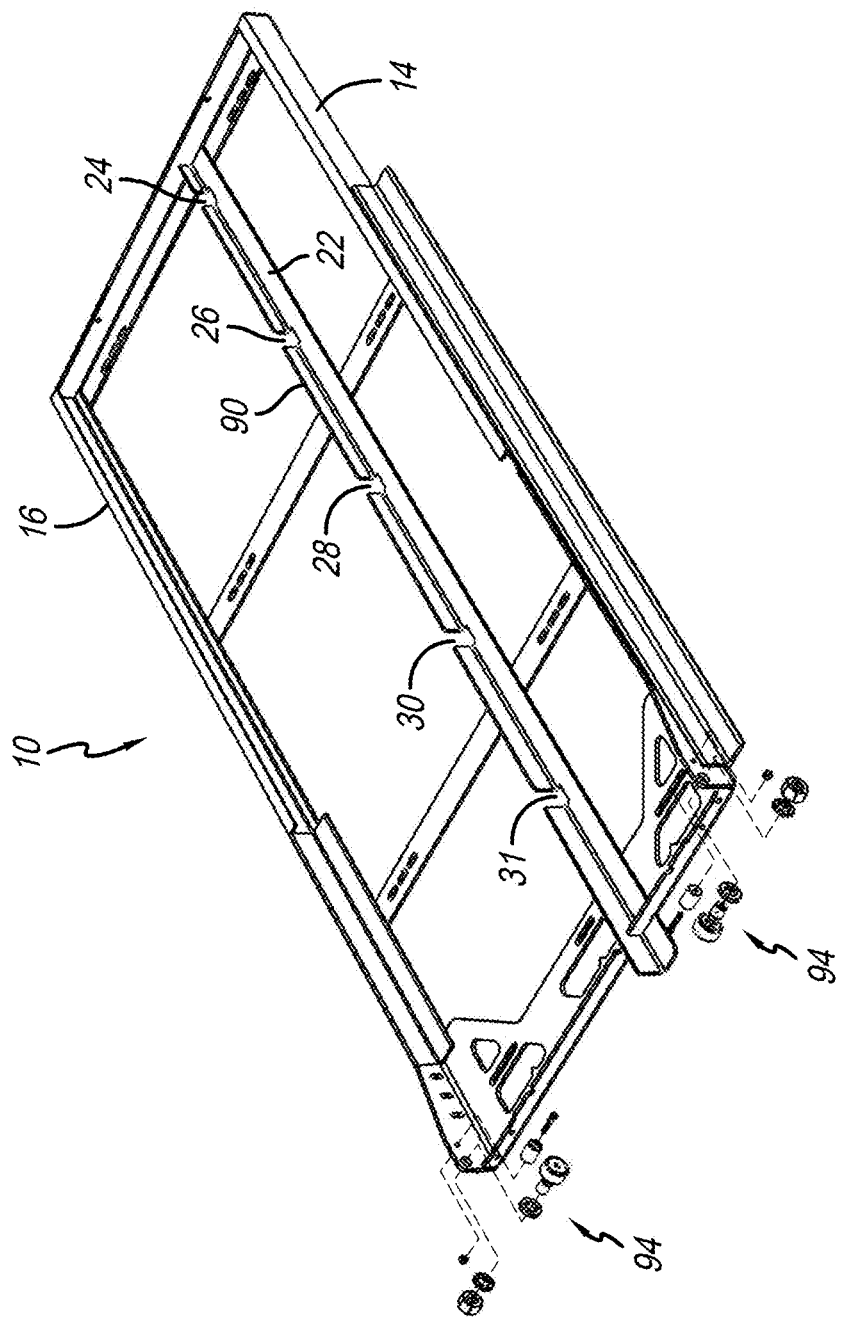
FIG. 16 is another perspective top view of the bottom frame assembly with roller bearings shown in exploded view.

A perspective view of bottom frame assembly 10 is shown in FIG. 15. This view further depicts latch bar 22 with latch stop openings 24, 26, 28, 30, and 31 extending along the longitudinal length of bottom frame assembly 10. Additionally, rollers 94 are illustratively positioned adjacent the leading edge of bottom frame assembly 10 to allow middle frame assembly 12 to move there along. Side tracks 14 and 16 accommodate rollers 48 on middle frame assembly 12, thereby permitting movement between the two. The view in FIG. 16 is the same as that of FIG. 15 with rollers 94 shown in exploded view.

Figure 17:
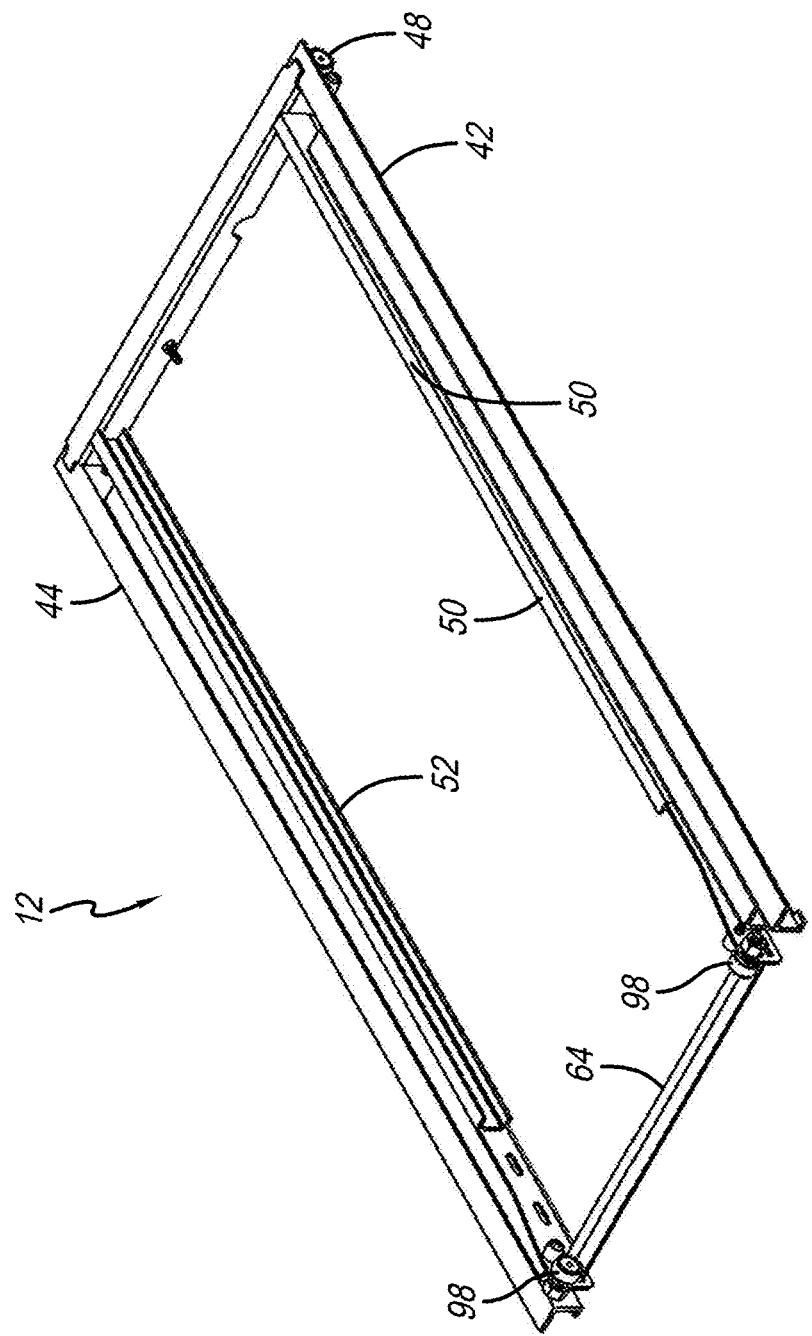
FIG. 17 is a top perspective view of a middle frame assembly.
Figure 18:
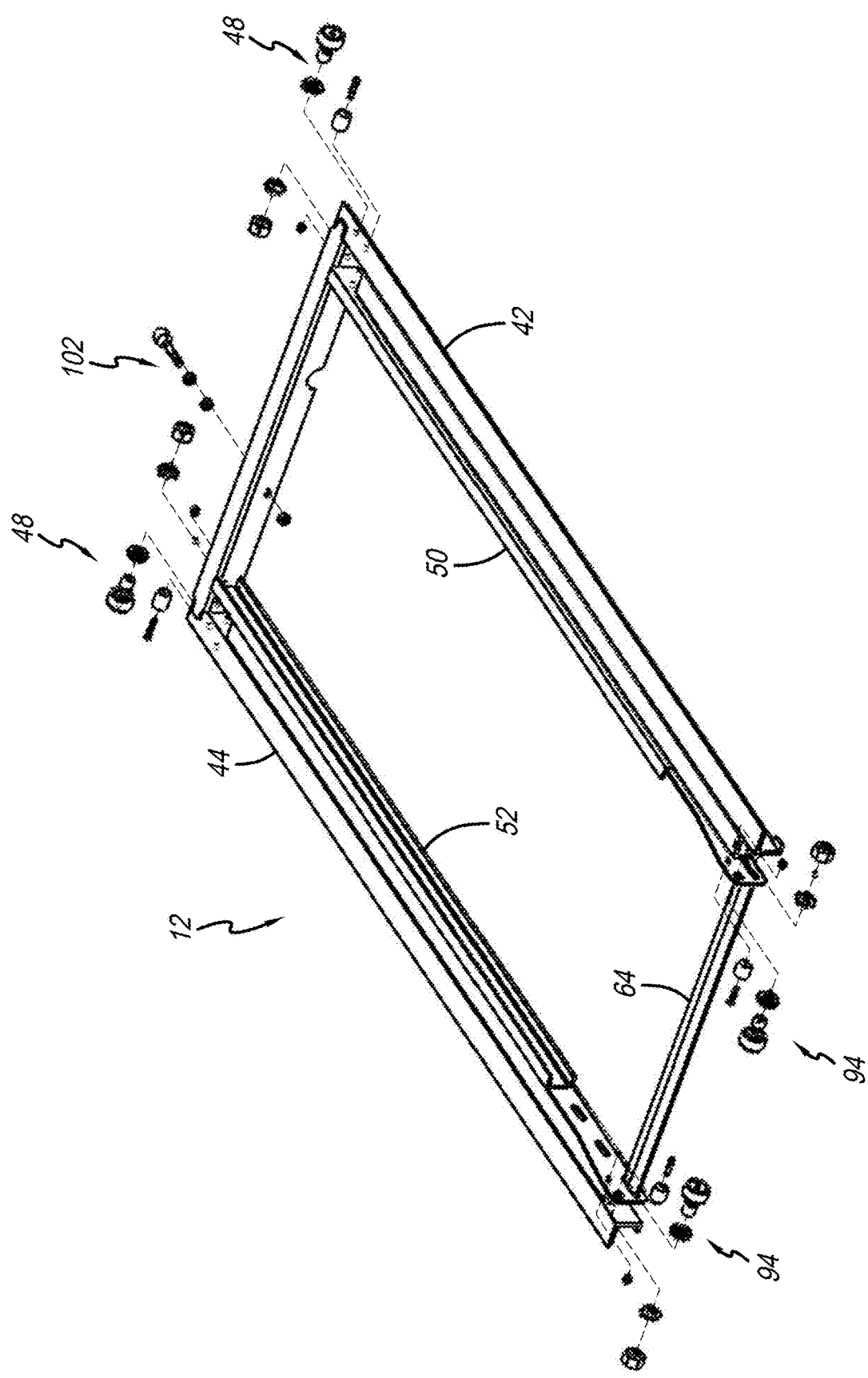
FIG. 18 is another top perspective view of the middle frame assembly with the rolling assemblies in exploded view.

A perspective view of middle frame assembly 12 is shown in FIGS. 17 and 18. Middle frame assembly 12 includes crossbar 64 extending between sidebars 42 and 44, as well as side tracks 50 and 52. Crossbar 64 is what hook 62 of top frame assembly 8 engages in order to move middle frame assembly 12 with top frame assembly 8. Rollers 98 assist top frame assembly 8 to move with respect to middle frame assembly 12. Rollers 48 are configured to move within side tracks 14 and 16 of bottom frame assembly 10. The view in FIG. 18 is similar to that of FIG. 17 with the exception of rollers 98 and 48 shown in exploded view. A stop assembly 102 is shown in exploded view as well.

Figure 19:
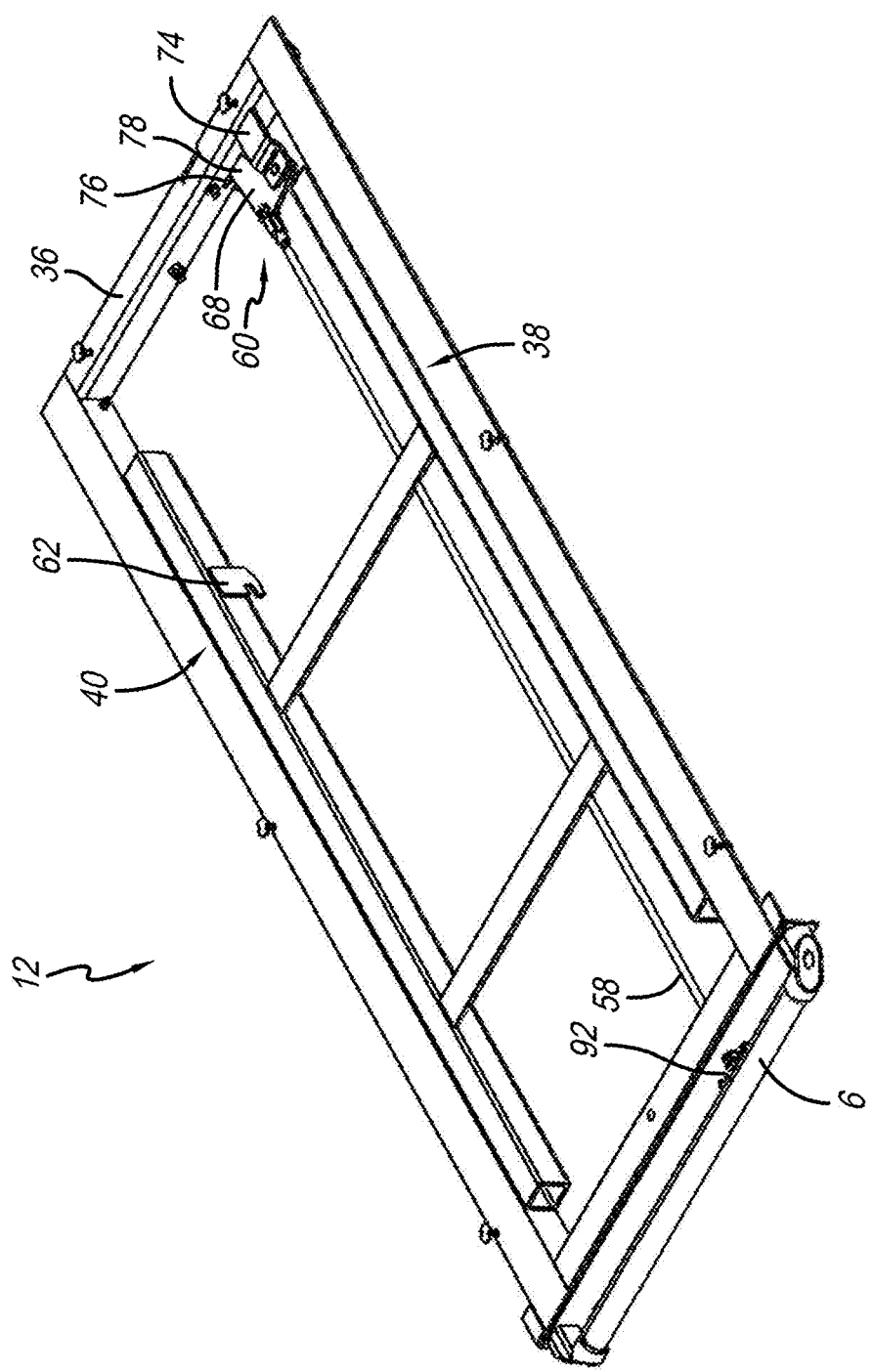
FIG. 19 is a top perspective view of a top frame assembly.
Figure 20:
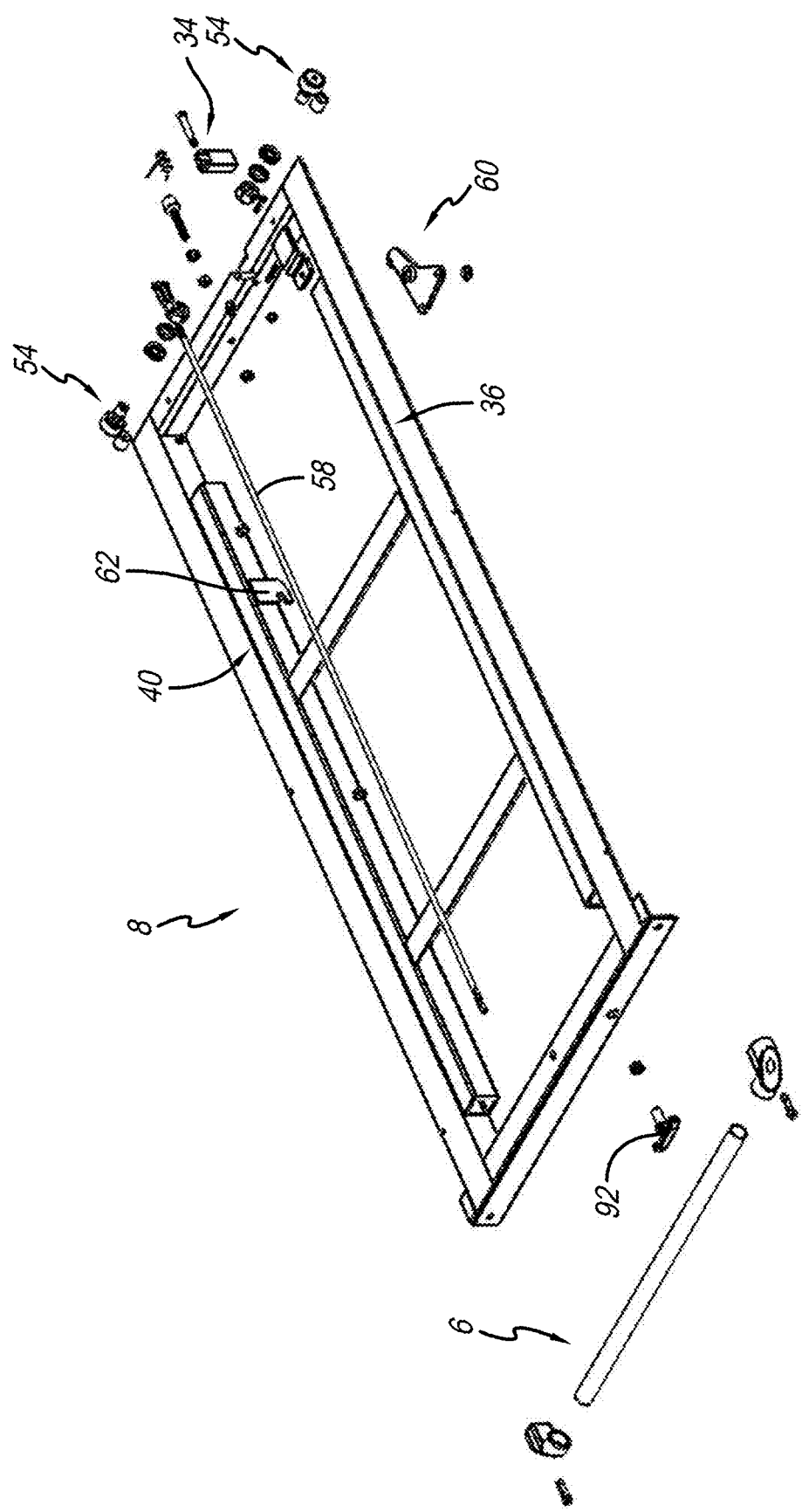
FIG. 20 is another top perspective view of the top frame assembly with components of same in exploded view.
Figure 24:
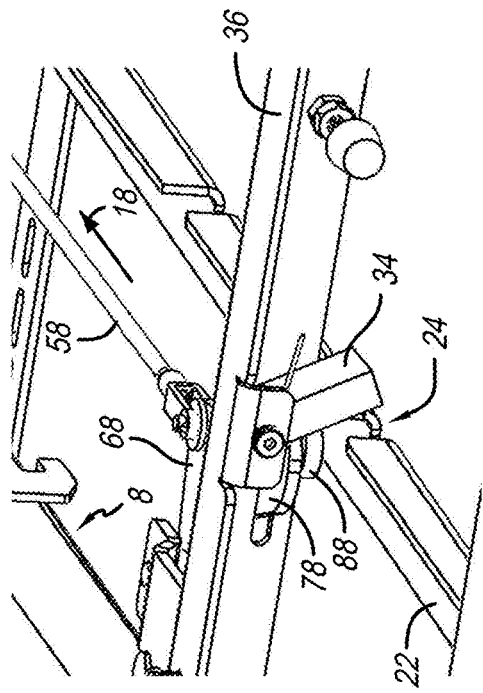
FIG. 24 is a perspective detail view of the bedslide assembly showing a portion of the latch assembly.

Perspective views of top frame assembly 8 are shown in FIGS. 19 and 20. These views show longitudinally extending rod 58 extending between grip 92 and latching assembly 60. This view also shows hook 62 attached to sidebar 40. It is appreciated that a hook 62 can be positioned on each side of top frame assembly 8 (i.e., on sidebars 38 and 40, see, also. FIG. 24) in order to pull middle frame assembly 12 as previously discussed. Back plate 36 is shown extending between sides of top frame assembly 8. Bracket 74 is attached to back plate 36 and plate 68 with latch arm 78 shown disposed through slot 76 of back plate 36. The view in FIG. 20 is similar to that of FIG. 19 with the exception of latch 34, latching assembly 60, rollers 54, longitudinally extending rod 58, grip 92, and handle 6 in exploded view.

Figure 21:
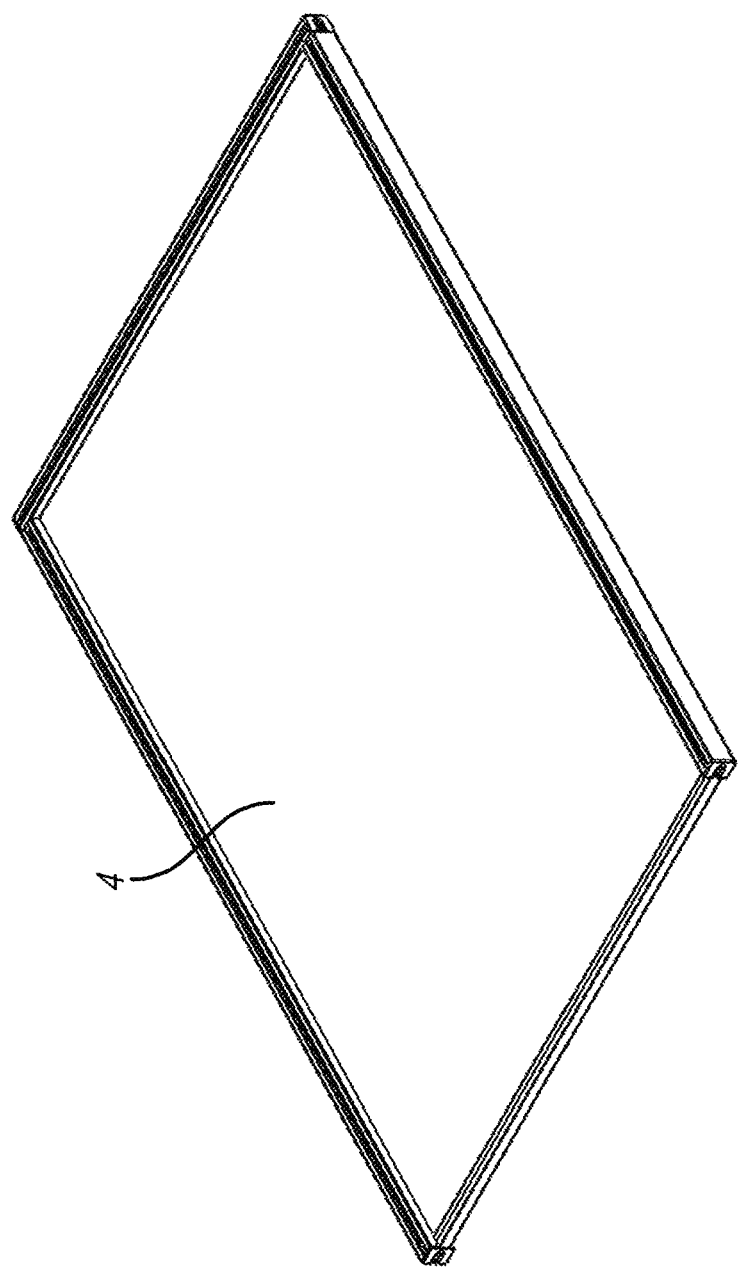
FIG. 21 is a perspective view of the bedslide deck.

A perspective view of deck 4 from bedslide assembly 2 is shown in FIG. 21. Deck 4 is configured to attach onto top frame assembly 8 so that, as it moves in directions 18 and 20, so too does deck 4.

Figure 22:
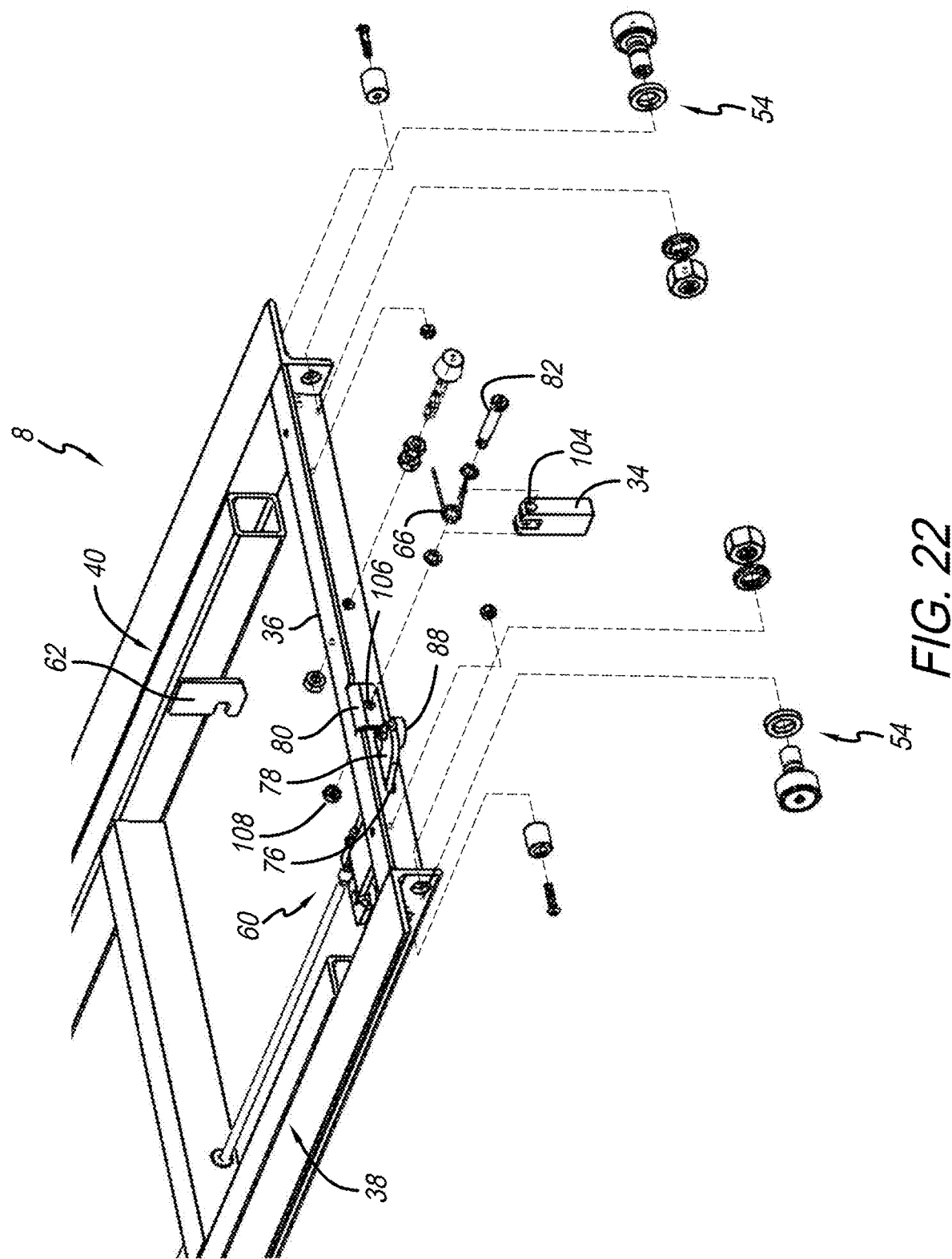
FIG. 22 is a perspective view of a portion of the top frame assembly showing bearing and latch assembly in exploded view.

A perspective view of a rear portion of top frame assembly 8 is shown in FIG. 22. In addition to showing exploded views of rollers 54, the components related to latch 34 are shown in exploded view. This includes pin 82 and spring 66. Illustratively, latch 34 is fitted within bracket 80 on back plate 36. Pin 82 is disposed through opening 104 in latch 34, opening 106, and bracket 80. Spring 66 is configured to be disposed about pin 82 in order to bias latch 34. Nut 108 may thread onto pin 82 in order to secure the structures together on back plate 36. This view also shows latch arm 78 extending through slot 76 disposed through back plate 36 in order to engage latch 34. Push pad 88 is illustratively attached to the end of latch arm 78 to engage latch 34 for purposes of moving same.

Figure 23:
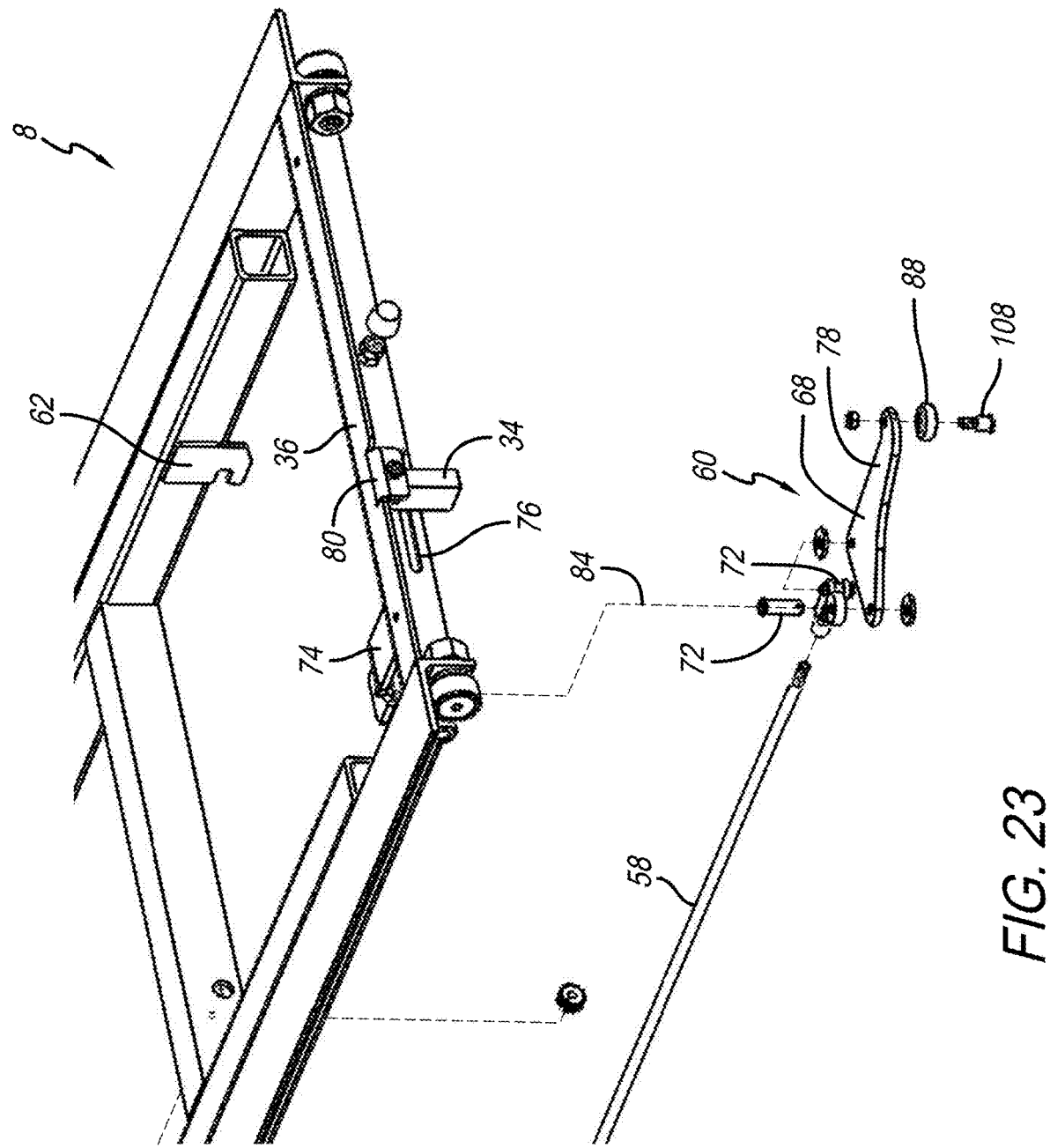
FIG. 23 is a partially assembled perspective detail view of the top frame assembly with a portion of the latching assembly depicted in exploded view.

A partially assembled perspective detail view of top frame assembly 8, with latching assembly 60 shown in exploded view, is shown in FIG. 23. This view shows how pin 72 extends through plate 68 in order to pivotally attach to bracket 74 of back plate 36. Plate 68 is configured to pivot about axis 84 in order to move latch arm 78 toward and away from latch 34. Longitudinally extending rod 58 couples to pin 70 so that when pulled, plate 68 will pivot in direction 83 (see FIGS. 7 and 8), about axis 84, in order to move latch 34. Push pad 88 is also shown attached to latch arm 78 via fastener 108. This view further depicts slot 76 disposed through back plate 36, as well as latch 34 pivotally attached to bracket 80.

Figure 25:
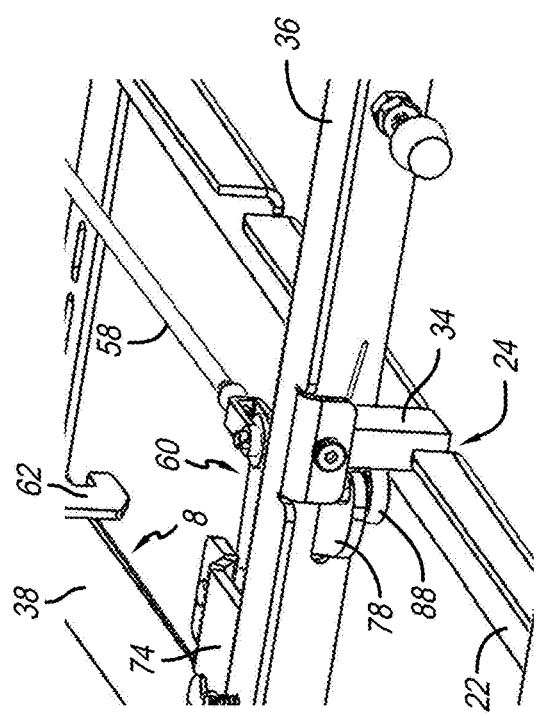
FIG. 25 is another perspective detail view of the bedslide assembly showing a portion of the latch assembly.
Figure 26:
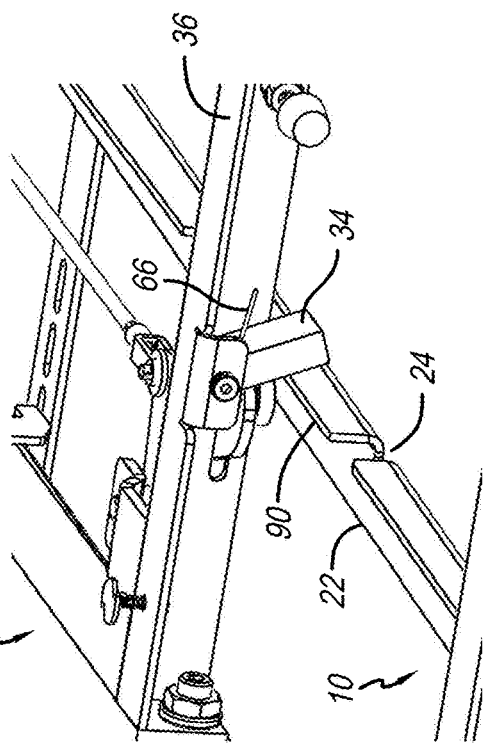
FIG. 26 is another perspective detail view of a portion of the bedslide assembly showing a portion of the latch assembly.

Perspective detail views of a portion of bedslide assembly 2, showing latch arm 78 moving latch 34 from one of the latch stop openings, is shown in FIGS. 24, 25, and 26. The view in FIG. 24 depicts latch arm 78 with push pad 88 adjacent latch 34, which is still positioned within latch stop opening 24 of latch bar 22. When in this position, top frame assembly 8 cannot move with respect to bottom frame assembly 10.

The view in FIG. 25 is similar to that of FIG. 24 except here longitudinally extending rod 58 is moved in direction 18 causing plate 68 to pivot. This causes latch arm 78 and, thus, push pad 88, to move latch 34 out of latch stop opening 24. In this configuration, top frame assembly 8 is now able to move with respect to bottom frame assembly 10.

To that end, as shown in FIG. 26, top frame assembly 8 is able to move with respect to bottom frame assembly 10 because latch 34 is no longer being held within latch stop opening 24 on latch bar 22. It is further appreciated that because spring 66 biases latch 34 towards the latch stop openings, latch 34 will ride along top edge 90 of latch bar 22 until another latch stop opening is encountered. When that happens, latch 34 will be automatically biased in a direction towards the latch stop opening. Also, latch arm 78 of latching assembly 60 will not be an obstruction for latch 34 because, unless longitudinally extending rod 8 is pulled in direction 18 to move latch arm 78, it will not be in the way so latch 34 can fit in a latch stop opening like that shown in FIG. 24.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, the disclosure from this non-provisional patent application controls.

What is claimed:

1. A bedslide assembly comprising:
   a first frame assembly;
   wherein the first frame assembly includes a longitudinally extending latch bar having a plurality of latch stop openings periodically located along the longitudinally extending latch bar;
   a second frame assembly movable relative to the first frame assembly;
   a deck attached to the second frame assembly;
   a grip coupled to the second frame assembly;
   a latching assembly to selectively secure the second frame assembly at predetermined locations along its path of travel;
   wherein the predetermined locations are defined by the plurality of latch stop openings periodically located along the longitudinally extending latch bar;
   a longitudinally extending rod coupled to the grip;
   wherein the latching assembly includes a plate pivotally coupled about an axis to the second frame assembly;
   wherein the longitudinally extending rod is pivotally coupled to the plate and spaced apart from the axis such that movement of the grip moves the longitudinally extending rod which pivots the plate about the axis;
   wherein the plate includes a latch arm;
   a latch pivotally attached to the second frame assembly; and
   a spring having a bias that moves at least a portion of the latch towards the longitudinally extending latch bar;
   wherein upon movement of the longitudinally extending rod in a first direction pivots the plate which moves the latch arm in order to engage and pivot the latch against the bias of the spring and away from the longitudinally extending latch bar.

2. The bedslide assembly of claim 1, wherein the latch is sized to fit into each one of the plurality of latch stop openings so that when the latch is located in one of the plurality of latch stop openings the latch prevents movement of the second frame assembly with respect to the first frame assembly.

3. The bedslide assembly of claim 1, wherein when movement of the grip moves the latch out from one of the plurality of latch stop openings the second frame assembly is movable with respect to the first frame assembly.

4. The bedslide assembly of claim 1, wherein when the latch is located adjacent the longitudinally extending latch bar but not in any one of the plurality of latch stop openings the second frame assembly is movable with respect to the first frame assembly until the latch engages a second of the plurality of latch stop openings at which point the second frame assembly is no longer movable with respect to the first frame assembly.

5. The bedslide assembly of claim 1, wherein movement of the longitudinally extending rod in a second direction moves the latch arm away from the latch causing the bias of the spring to move the latch toward the longitudinally extending latch bar.

6. The bedslide assembly of claim 1, wherein the latch is configured to fit in one of the plurality of latch stop openings.

7. The bedslide assembly of claim 1, wherein when the longitudinally extending rod is not moved in the first direction the bias of the spring moves the latch toward the longitudinally extending latch bar.

8. The bedslide assembly of claim 1, wherein the latch is not attached to the plate.

9. The bedslide assembly of claim 1, further comprising a third frame assembly, at least a portion of which is located between the first frame assembly and the second frame assembly.

10. The bedslide assembly of claim 9, wherein the second frame assembly includes a hook that couples to the third frame assembly to move the third frame assembly with the second frame assembly when the second frame assembly moves to an extended position from the first frame assembly.

11. The bedslide assembly of claim 1, wherein the latch arm pushes the latch out from one of the plurality of latch stop openings when the longitudinally extending rod is moved in the first direction and moves away from the latch when the longitudinally extending rod is moved in a second direction.

12. The bedslide assembly of claim 1, wherein a pivot pin is disposed through the plate coincident with the axis which allows the plate to pivot.

13. The bedslide assembly of claim 1, wherein the latch arm includes a push pad that is engageable with the latch to move the latch against the bias of the spring.

14. A bedslide assembly comprising:
a movable deck frame assembly;
a grip coupled to the deck frame assembly;
a latching assembly attached to the deck frame assembly;
a longitudinally extending rod coupled to the grip;
wherein the latching assembly includes a plate that is pivotally coupled about an axis to the deck frame assembly;
wherein the longitudinally extending rod is coupled to the plate at a location that is spaced apart from the axis such that movement of the grip moves the longitudinally extending rod which pivots the plate about the axis;
wherein the plate includes a latch arm; and
a latch that is not attached to the latching assembly;
wherein upon movement of the longitudinally extending rod in a first direction pivots the plate which moves the latch arm in order to abut and move the latch.

15. The bedslide assembly of claim 14, further comprising a bottom frame assembly, wherein the bottom frame assembly is configured to attach to a cargo box floor, and wherein the bottom frame assembly includes a longitudinally extending latch bar having a plurality of latch stop openings periodically located along the longitudinally extending latch bar.

16. The bedslide assembly of claim 15, wherein the deck frame assembly is movable relative to the bottom frame assembly.

17. The bedslide assembly of claim 16, wherein the latching assembly selectively secures the deck frame assembly at predetermined locations along its path of travel, and wherein the predetermined locations are defined by the plurality of latch stop openings periodically located along the longitudinally extending latch bar.

18. The bedslide assembly of claim 14, wherein the latch is pivotally attached to the deck frame assembly.

19. The bedslide assembly of claim 14, wherein bias of a spring moves at least a portion of the latch away from the latch arm.

20. The bedslide assembly of claim 14, wherein the latch arm abuts and moves the latch.

* * * * *